(12) United States Patent
Heston

(10) Patent No.: US 6,533,533 B1
(45) Date of Patent: Mar. 18, 2003

(54) ARTICLE HANDLING DEVICE AND SYSTEM

(76) Inventor: Stephen L. Heston, 1324 Jay Ct., West Linn, OR (US) 97068

( * ) Notice: Subject to any disclaimer, the term of this patent is extended or adjusted under 35 U.S.C. 154(b) by 0 days.

(21) Appl. No.: 09/418,137

(22) Filed: Oct. 14, 1999

Related U.S. Application Data

(63) Continuation-in-part of application No. 09/059,075, filed on Apr. 9, 1998, now Pat. No. 5,984,620, which is a continuation-in-part of application No. 09/018,388, filed on Feb. 4, 1998, now Pat. No. 5,971,700.

(51) Int. Cl.⁷ .......................................... B65G 57/112
(52) U.S. Cl. ................... 414/791.6; 414/793.6
(58) Field of Search .................... 198/468.6, 468.8; 414/791.6, 792.6, 792.8, 793.4, 793.5, 793.6, 799; 53/399

(56) References Cited

U.S. PATENT DOCUMENTS

| 3,263,827 | A | | 8/1966 | Verrinder | |
|---|---|---|---|---|---|
| 3,520,422 | A | | 7/1970 | Bruce et al. | |
| 3,625,376 | A | | 12/1971 | McWilliams | |
| 3,669,282 | A | | 6/1972 | Carlson | |
| 3,782,564 | A | * | 1/1974 | Burt | 414/281 |
| 3,836,018 | A | * | 9/1974 | Dawson et al. | 414/790.9 |
| 4,022,334 | A | | 5/1977 | Lässig | |
| 5,623,808 | A | * | 4/1997 | Franklin et al. | 53/399 |
| 5,758,471 | A | * | 6/1998 | Denley et al. | 53/399 |

* cited by examiner

Primary Examiner—Janice L. Krizek
(74) Attorney, Agent, or Firm—Keith A. Cushing

(57) ABSTRACT

A pick and place device includes a lift head and a build platform. Both the lift head and the build platform include flexible aprons. An item layer is constructed on the build platform and the lift head is moved into position over the build platform. By slipping the lift head apron under the layer while concurrently pulling from under the layer the build platform apron, support for the layer passes from the build platform to the lift head. The lift head then moves to a place site and the lift head apron is pulled from under the layer and the layer falls from the lift head onto the place site. Under one form of the device, the layer may be constructed directly upon the lift head apron and then moved to a place site and deposited thereat by pulling the lift head apron from thereunder. Tower configurations illustrated define a vertical column of space including a layer pre-build table, layer transport and layer stacking occurring therewithin. In one embodiment, an automated stretch wrapper also operates concurrently with palletizing operations. As a result, high speed palletizing is accomplished with a palletizing system occupying minimum floor space.

13 Claims, 22 Drawing Sheets

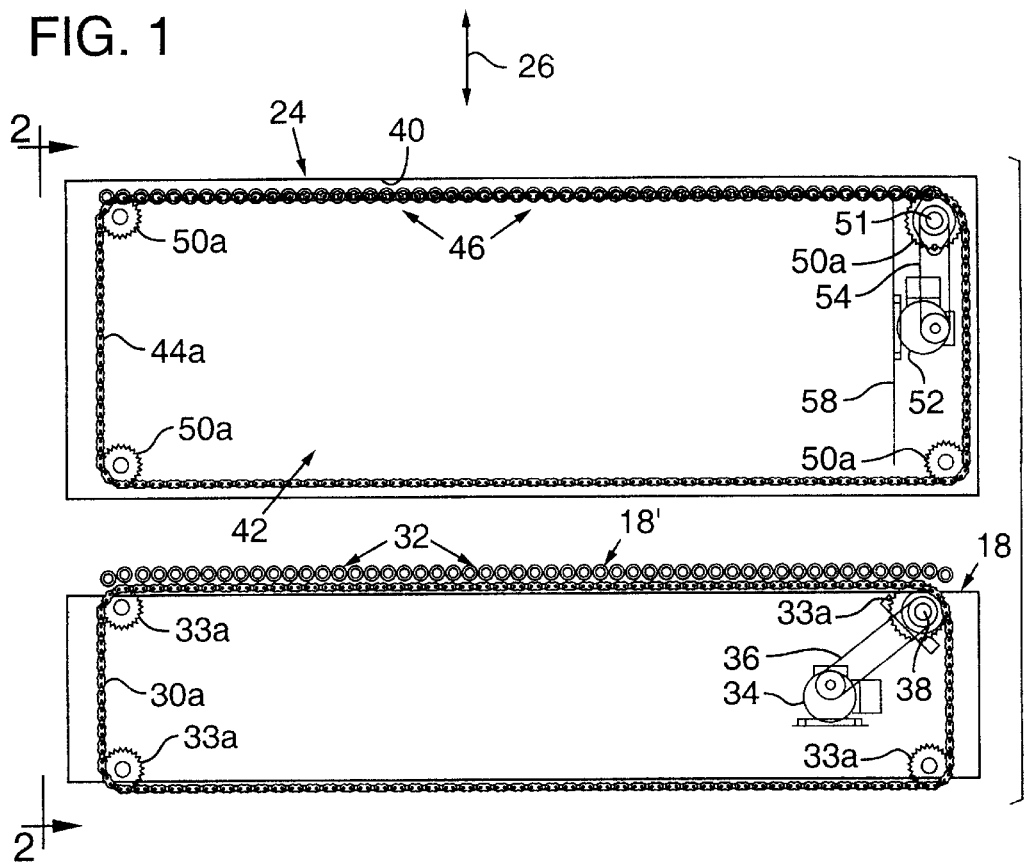

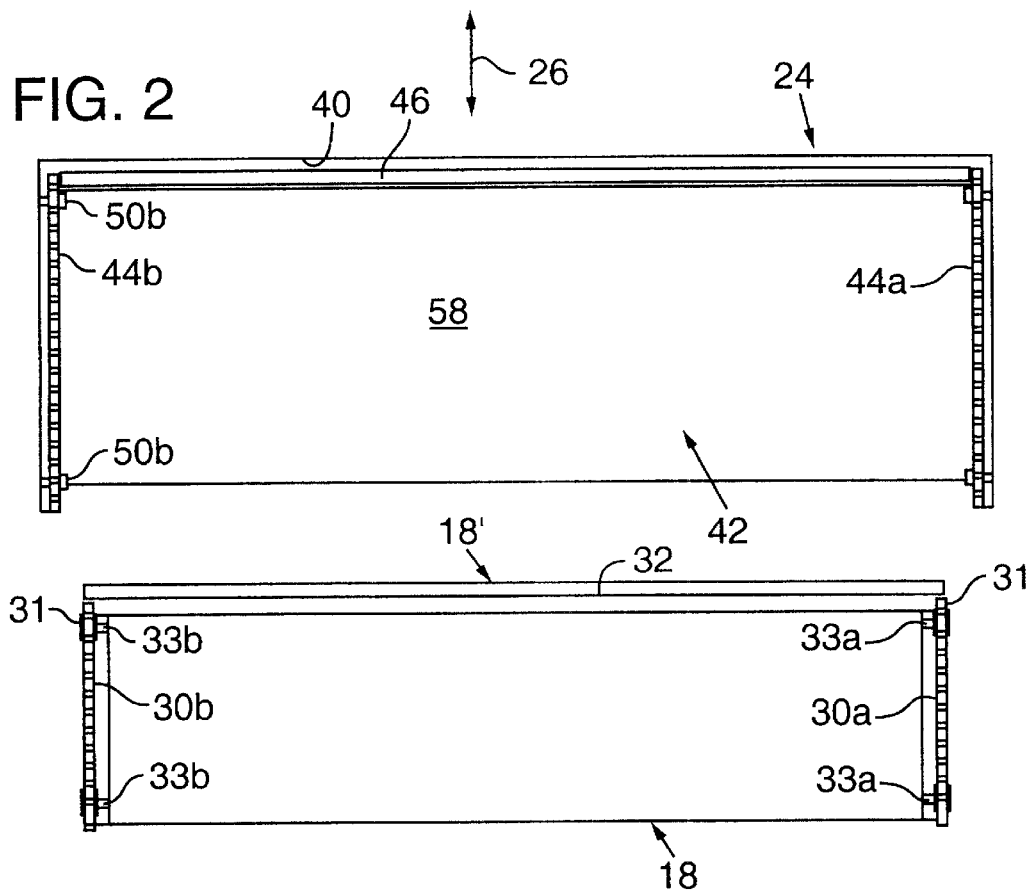

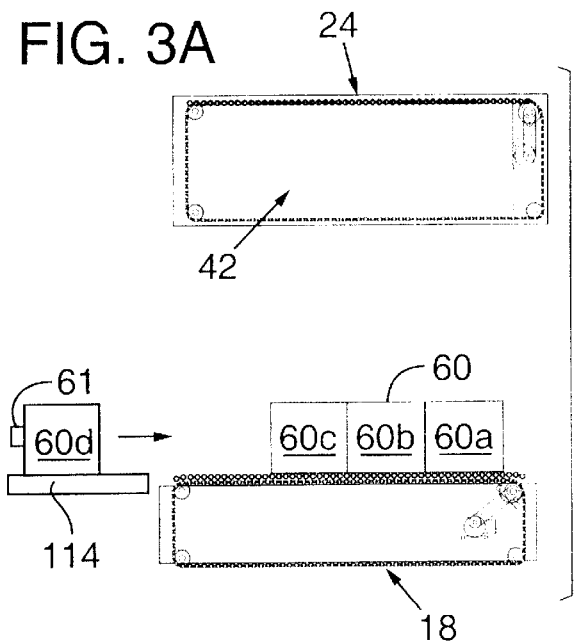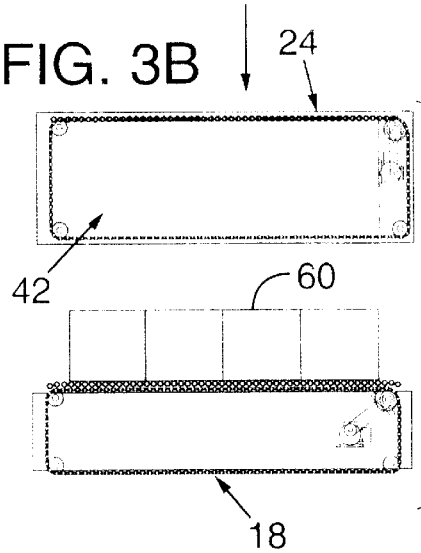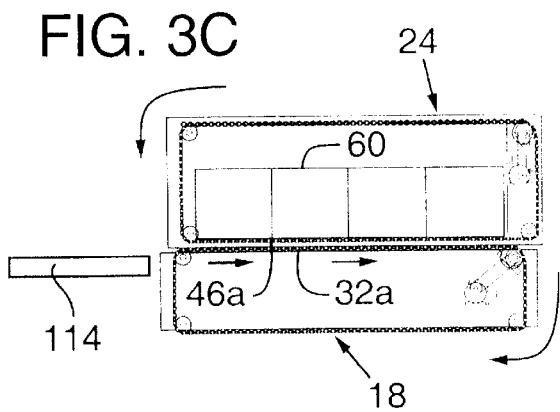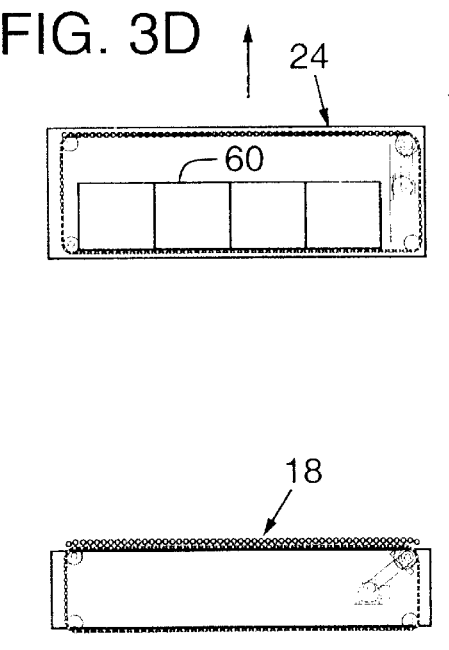

ARTICLE HANDLING DEVICE AND SYSTEM

RELATED APPLICATIONS

The present application is a continuation-in-part of prior co-pending and allowed application Ser. No. 09/059,075 filed Apr. 9, 1998 now U.S. Pat. No. 5,984,620 and entitled PICK AND PLACE PALLETIZING DEVICE. The present application is a continuation-in-part of prior co-pending and allowed application Ser. No. 09/018,388 filed Feb. 4, 1998 and entitled FIXED PATH PICK AND PLACE DEVICE, now U.S. Pat. No. 5,971,700.

BACKGROUND OF THE INVENTION

The present invention relates generally to article manipulation, and particularly to manipulation of entire layers of items during handling operations.

A pallet is a standard support and carrier structure used in shipping. Pallets provide a support surface receiving items stacked for transport. Pallets include a space below the support surface receiving, for example, the tines of a forklift whereby the forklift lifts and moves the pallet with a stack of items thereon. Typically, items are boxes organized in layers upon the pallet. Efficient shipping of palletized items calls for efficient stacking of items on the pallet to minimize open space within the stack. Furthermore, by varying the orientation and/or pattern of items from layer to layer, a stable stack of items may be constructed upon a pallet. Accordingly, a variety of "box patterns" have emerged for efficient and stable packing together of items in item layers on a pallet. The standard pallet is used widely throughout the shipping industry and a variety of apparatus have evolved in relation to the standard pallet for stacking items upon pallets, i.e., for palletizing.

Thus, palletizing, as used herein, generally refers to a process of constructing a stack of items organized as layers on a pallet. The term palletizing as used herein, however, shall not be limited to stacking relative to a pallet, but shall include generally any stacking process relative to articles organized as stacked layers.

A common arrangement for palletizing uses a rigid planar "apron" to lift from below a layer of items. A layer might be built upon an apron or the apron might be positioned under the layer by sliding the apron between the layer and a supporting surface therebelow. Once positioned below a layer of items, the apron moves and places the item layer elsewhere, e.g., moves the item layer over a pallet or the top layer of a stack of item layers on a pallet. The palletizing device then blocks the layer against movement while the apron slides out from underneath the layer. In this manner, the apron moves and places an entire layer of items upon a pallet or upon the top layer of items on a pallet. Generally, an apron performs only palletizing operations because of the difficulty of inserting an apron between layers of an existing stack of items on a pallet. Unfortunately, use of such a rigid planar apron requires significant space adjacent the pallet stack to accommodate the apron as it is pulled from under the item layer.

One known prior palletizing device, available from the Matthews Conveyor Division, uses a "wrap-around apron" including a set of rollers positioned above a pallet. An item layer is constructed on the rollers and the pallet including any layers stacked thereon moves upward to a point just below the rollers. The item layer is then blocked against movement and the rollers are pulled out from underneath the item layer resting thereon. The item layer thereby drops onto the pallet or stack of item layers resting on the pallet. Unfortunately, this arrangement requires manipulation of the entire pallet and stack of item layers resting on the pallet to position the upper portion thereof just below the rollers and allow a new item layer to come to rest thereon as the rollers are pulled out from thereunder. Accordingly, the rollers follow a path out from underneath the new layer and then down, around, and underneath the entire pallet and stack of items resting thereon. This device is referred to as a "WR Series Palletizer."

U.S. Pat. No. 3,782,564 entitled Product Picking Stacker Crane System, filed Sep. 27, 1971 by Harold S. Burt, shows an overhead crane system transferring item layers from one stack to an adjacent stack. The system is a dual actuator system requiring separate vertical movement actuators and horizontal movement actuators operating in coordination.

U.S. Pat. No. 3,836,018 entitle Discrete Article Palletizing and De-Palletizing apparatus, filed Nov. 5, 1973 by George J. Dawson, et al shows a palletizing device including a top-picking engagement mechanism and a dual actuation drive system, i.e., a horizontal actuation system and a separate vertical actuation system. The illustrated apparatus moves item layers between a first station and a second station.

Thus, article manipulation in the context of palletizing generally requires relatively complex apparatus and associated complex control schemes. Devices using multiple actuators, e.g., gantry systems with x-y positioning of a load, result in relatively complex and expensive apparatus. Because such systems include separate actuation devices operating in different dimensions, e.g., separate devices for movement in an x dimension and a y dimension, such systems can cause abrupt transition in vertical or horizontal movement and thereby risk loss of a load. To avoid such abrupt transition in movement, elaborate coordination and control must be imposed upon the separate actuation devices to accomplish smooth transition in vertical and horizontal movement.

Thus, it would be desirable to provide a palletizing apparatus having a simplified structural architecture and a simplified control scheme for reduced overall cost and reduced overall complexity with a smooth transition in movement of loads.

SUMMARY OF THE INVENTION

An article handling system according to a preferred form of the present invention includes a frame defining generally a vertical column of space. An infeed system is positioned relative to an upper portion of the vertical column of space. The infeed system receives a series of items for palletizing. A pre-build table receives items from the infeed system organized as a layer of items. The layer is then transported vertically downward to a stacking site at a lower portion of the vertical column of space. In one embodiment of the invention, the build table serves also as a transport carrier. In another embodiment, the build table remains stationary at the upper portion of the vertical column of space and a separate transport carrier accepts the layer of items from the build table and moves the layer of items vertically downward and stacks the layer at the lower portion of the vertical column of space. One embodiment of the invention also includes a stretch wrap system operating within the same vertical column of space and concurrently with palletizing operations. Overall, high speed palletizing results with a minimum foot print requirement.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 1 illustrates a lift head and a layer build platform according to a first embodiment of the present invention.

FIG. 2 illustrates the lift head and layer build platform of FIG. 1 as viewed along lines 2—2 of FIG. 1.

FIGS. 3A–3D illustrate operation and interaction between the lift head and layer build platform of FIGS. 1 and 2 in transferring an item layer from the build platform to the lift head according to a preferred embodiment of the present invention.

DETAILED DESCRIPTION OF THE PREFERRED EMBODIMENT

Figure 4:
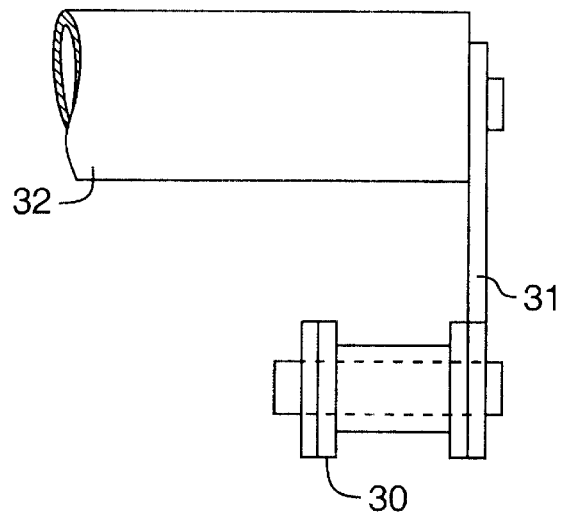
FIG. 4 illustrates in more detail a portion of the build platform of FIGS. 1 and 2.

FIG. 1 illustrates schematically a layer build platform 18 and a lift head 24. FIG. 2 illustrates schematically an end view of build platform 18 and lift head 24 as seen along lines 2—2 of FIG. 1. As will be discussed more fully hereafter, build platform 18 receives a layer of items, e.g., boxes, to be stacked on a pallet. Lift head 24 picks an entire item layer from build platform 18 and places the item layer upon a pallet or upon a stack of item layers on a pallet. Lift head 24 is moveable relative to build platform 18 as indicated at reference numeral 26.

With reference to FIGS. 1 and 2, build platform 18 includes a chain loop 30a and a chain loop 30b in face-to-face relation. A set of roller tubes 32 interconnect corresponding portions, i.e., a sequence of consecutive links, of chain loops 30a and 30b. Thus, the set of roller tubes 32 provide a flexible support platform which may be moved by synchronized movement of chains 30a and 30b. More particularly, when positioned as illustrated in FIGS. 1 and 2, roller tubes 32 provide an upward-facing item layer support site 18'. A set of sprockets 33a and a set of sprockets 33b support chains 30a and 30b, respectively, each in a generally rectangular loop formation. A drive motor 34 couples via drive chain 36 to a drive shaft 38. Drive motor 34 thereby moves chains 30a and 30b in unison.

Thus, the set of roller tubes 32 interconnecting chains 30a and 30b as positioned across the upper portion of build platform 18 establish support site 18' whereat a layer of items may be positioned and organized in preparation for engagement by lift head 24 as described more fully hereafter.

Lift head 24 defines an enclosure 40 including a downward-facing opening 42. Lift head 24 also includes a chain loop 44a and a chain loop 44b in face-to-face relation. A set of roller tubes 46 interconnect corresponding portions, i.e., a sequence of consecutive links, of chains 44a and 44b. Thus, roller tubes 46 establish a support platform which may be moved by synchronized movement of chains 44a and 44b.

A set of sprockets 50a support chain loop 44a and a set of sprockets 50b support chain loop 44b. A drive motor 52 couples via drive chain 54 to a drive shaft 51 carrying one of sprockets 50a and one of sprockets 50b. In this manner, operation of drive motor 52 moves chain loops 44a and 44b in unison.

As positioned in FIGS. 1 and 2, chain loops 44a and 44b locate roller tubes 46 at an upper portion of enclosure 40. As a result, the lower downward-facing opening 42 of enclosure 40 is open. In such position, lift head 24 lowers over an item layer and thereby positions the item layer within enclosure 40. As described more fully hereafter, drive motor 52 then moves roller tubes 46 to occupy the downward-facing opening 42 and 20 thereby engage and support from below an item layer for transport away from support site 18'.

The set of roller tubes 32 and set of roller tubes 46 each provide a support apron supporting an item layer 60, but flexible in the dimension of travel to allow the support apron to travel under or out from under a layer 60 without requiring substantial adjacent space as is required in the case of rigid aprons.

FIGS. 3A–3D illustrate use of lift head 24 to pick an item layer 60 from build platform 18. In FIG. 3A, an item layer 60 has been positioned on site 18'. For example, a push bar 61 moves rows of boxes, individually rows 60a–60d, onto site 18'. FIG. 3A illustrates the last row 60d of boxes being pushed onto site 18' of build platform 18. Item layer 60 construction occurs in conventional fashion whereby push bar 61 engages a row of boxes or items on a conveyor 114 and pushes the row into position on site 18' within an item layer 60. Thus, conveyor 114 delivers a series of boxes and push bar 61 pushes the leading set of boxes as a layer row onto site 18' in conventional fashion until a complete item layer 60 has been fully constructed at site 18'. While shown above build platform 18 in FIG. 3A, it will be understood that lift head 24 may be off doing other tasks, i.e., delivering a previous item layer 60 to a pallet stack, thereby facilitating continuous layer 60 building at site 18' and concurrent stacking of item layers 60.

FIG. 3B illustrates a completed item layer 60 resting on site 18'. Lift head 24 moves down toward item layer 60. With roller tubes 46 positioned as illustrated at an upper portion of enclosure 40, downward-facing opening 42 is clear, i.e., open, and lift head 24 encloses item layer 60 as shown in FIG. 3C.

In FIG. 3C, by coordinated actuation of drive motors 34 and 52 and coordinated positioning of roller tubes 32 and 46, layer 60 passes from build platform 18 to lift head 24. Once lift head 24 receives therein an item layer 60 through the downward-facing opening 42, drive motor 34 moves layer 60 rightward (in the view of FIG. 3C) until layer 60 engages stop plate 58 of lift head 24. As the set of roller tubes 32 of build platform 18 move from underneath layer 60, the set of roller tubes 46 of lift head 24 follow and move under layer 60 to then support and carry layer 60. More particularly, as a trailing roller tube 32a first passes under item layer 60 a leading roller tube 46a follows immediately thereafter and assumes support for item layer 60. Eventually, support for item layer 60 passes from roller tubes 32 to roller tubes 46. As viewed in FIG. 3C, chain loops 44a and 44b move counter clockwise while chain loops 30a and 30b move clockwise. In this manner, build platform 18 passes layer 60 to lift head 24. Once roller tubes 32 move from under layer 60 and roller tubes 46 move fully under layer 60, lift head 24 moves vertically upward as illustrated in FIG. 3D. Lift head 24 thereafter moves over a pallet or a stack of layers on a pallet. Chain loops 44a and 44b then move further counter clockwise and layer 60 bears against stop plate 58. Eventually, downward-facing opening 42 opens and releases, i.e., drops, layer 60 onto a surface therebelow, e.g., onto a pallet or onto a stack of item layers 60 on a pallet.

While described as being co-planar, it will be understood that the portion of roller tubes 32 and 46 supporting a layer 60 during transfer need only be substantially co-planar, i.e., close enough to accomplish transfer. In some applications, it may be advantageous to locate roller tubes 46 slightly below roller tubes 32 to avoid potential jamming during the transfer. The allowed variation from an actual co-planar relationship will be a function of the particular items comprising layers 60 and degree of handling care required.

The relative length of roller tubes 32 and 46 support exchange at an item layer 60 from build platform 18 to lift head 24. In particular, roller tubes 32 are shorter than roller tubes 46 and allow the support surface defined by roller tubes 32 to occupy the same plane as the support surface defined by roller tubes 46. Thus, when build platform 18 "hands" a layer 60 to lift head 24, the support surfaces defined by roller tubes 32 and roller tubes 46 are coplanar and a smooth "hand off" from build platform 18 to lift head 24 occurs.

FIG. 4 illustrates in more detail a mounting arrangement for roller tubes 32 relative to chains 30. More particularly, an offset or extension 31 couples each roller tube 32 to the corresponding link of chain 30. Extension 31, in conjunction with the more narrow length of roller tubes 32 relative to roller tubes 46, allows roller tubes 32 to occupy the same plane as roller tubes 46 when passing a layer 60 from build platform 18 to lift head 24 as illustrated in FIG. 3C.

Figure 5:
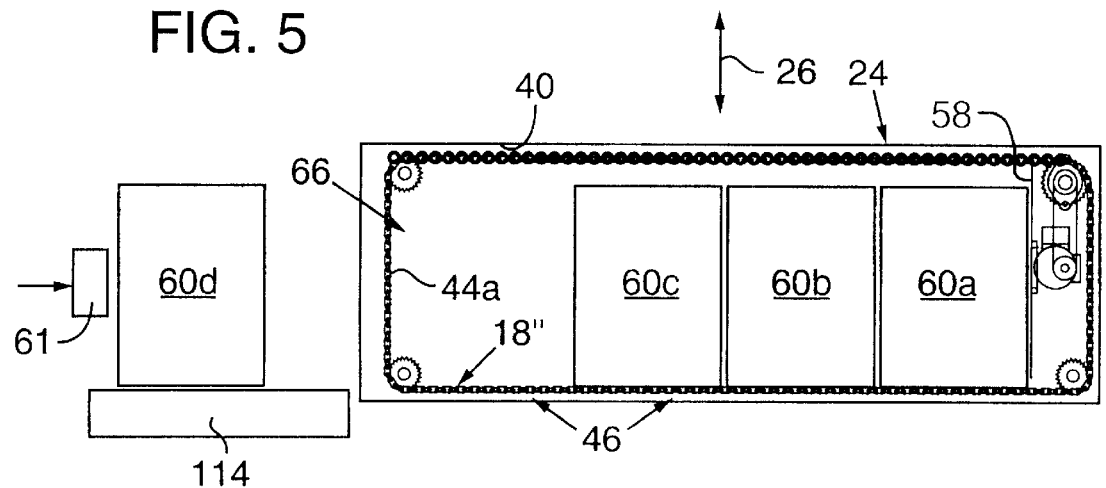
FIG. 5 illustrates an alternative method of loading an item layer onto the lift head of FIGS. 1 and 2 without requiring use of the build platform.

FIG. 5 illustrates an alternative method of loading a layer 60 upon lift head 24. In this particular arrangement, build platform 18 is eliminated. Lift head 24 receives a layer 60 by locating lift head 24 adjacent a layer building apparatus, e.g., conveyor 114 delivering a sequence of boxes. Drive motor 52 moves roller tubes 46 to a lower position, thereby defining a layer building site 18" within enclosure 40. Enclosure 40 includes an open leftward (as viewed in FIG. 5) end or opening 66. Rows of boxes, individually rows 60a–60d, are then pushed by bar 61 into enclosure 40 and onto site 18". Once a layer 60 has been pushed, row-by-row, onto site 18', lift head 24 moves to a drop site, i.e., to deliver the layer 60 upon a pallet or upon a stack of layers resting upon a pallet. As described earlier, to disengage a layer 60, lift head 24 activates drive motor 52 to move chains 44 counter clockwise (as viewed in FIG. 5) thereby pushing layer 60 against stop 58. Eventually all of roller tubes 46 move out from underneath layer 60. As a result, layer 60 drops onto the desired drop site, i.e., drops onto a pallet or onto a stack of layers upon a pallet. Because lift head 24 is vertically moveable, lift head 24 may be adjusted in position to gently drop a layer 60, i.e., let it fall approximately one inch, as it releases from lift head 24 and comes to rest upon a drop site therebelow.

Thus, build platform 18 allows concurrent construction of layers 60 while lift head 24 moves a previous layer 60 into position on a pallet or pallet stack. The particular arrangement illustrated in FIG. 5, however, does not allow concurrent construction of layers 60 and therefore operates at a relatively slower speed.

End plate 58 performs an important registration function. As a layer 60 pushes against end plate 58 it assumes a registration position coordinated with the position of a pallet whereby item layers 60 stack in coordinated and uniform relative position upon a pallet.

The roller tubes and chains of build platform 18 and lift head 24 may be provided by what is known as a "live tubular roller chain" as available from U.S. Tsubaki, Inc. under model No. TP 329-CP-44. Preferably, roller tubes 32 and 46 are of small dimension, e.g., ¾ inch diameter, and close lateral spacing, e.g., one inch spacing, to provide adequate support for item layers 60. While not required under the present invention, chains 30a and 30b could be incrementally advanced when loading an item layer 60 row-by-row onto site 18'. Roller tubes 32 and 46 offer little resistance when moving relative to an item layer 60 or when pushing rows of boxes onto a support surface defined thereby. Alternative structures include bars or slats spanning chains 30a and 30b and chains 44a and 44b in place of roller tubes 32 and 46, respectively.

While build platform 18 and lift head 24 have been described as including "chains" 30 and 44, it will be understood that a variety of alternative transport mechanisms may be employed. For example, cables, cogged timing belts, guide tracks, and the like may be employed to move structures, e.g., roller tubes, as described above in implementation of the build platform 18 and lift head 24.

FIGS. 6–9 illustrate a palletizer system 110 making use of the lift head 24 and build platform 18 of FIGS. 1 and 2.

System 110 palletizes, i.e., builds a stack of item layers 60 layer-by-layer upon a pallet. For purposes of clarity and simplicity, however, lift head 24 and build platform 18 will be shown schematically in system 110 as simple box-form structures. It will be apparent from the preceding discussion, however, that lift head 24 and build platform 18 may be integrated into system 110 and operate in a fashion as described above.

An item transport system 112 includes an item transport 114 driven by a reversible transport drive motor 116 and push bar 61. Item transport 114 interfaces with build platform 18 and push bar 61 (shown partially) to deliver item rows to site 18' and thereby constructs item layers 60 at site 18'. More particularly, transport 114 advances a sequence of boxes into position adjacent build platform 18 and push bar 61 engages a leading set of boxes as a layer row and pushes this row into position on site 18'. Transport 114 then advances a next set of boxes into position for engagement by push bar 61. Eventually, a complete item layer 60 is positioned at site 18'.

A pallet carrier 128, e.g., fork lift, moves pallets 127, into and out of pallet site 126. Pallets 127 are brought in empty and removed loaded during a palletizing operation as described herein. Pallet site 126, e.g., floor space, establishes an appropriate location for deposit of item layers 60 relative to a stack of item layers resting on a pallet 127 at site 126. As may be appreciated, each pallet 127 accommodates entry of carrier 128, i.e., the tines of a fork lift, whereby a pallet 127 may be moved onto or out of site 126 as necessary according to an ongoing palletizing operation.

Figure 6:
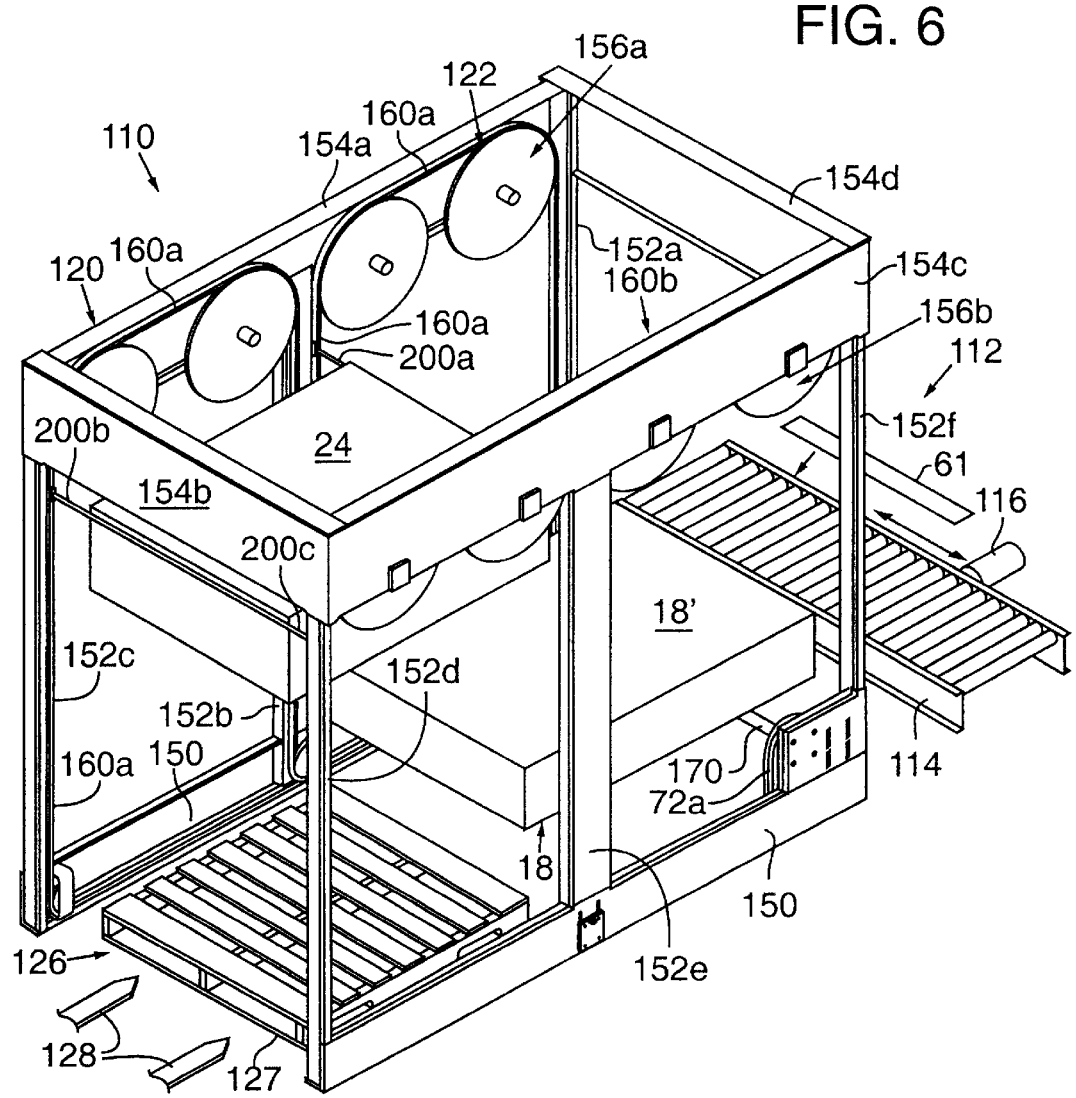
FIG. 6 illustrates in perspective a first pallet system making use of the lift head and build platform of FIGS. 1 and 2.

As viewed in FIG. 6, transport system 112 occupies a rightward side of system 110 and pallet carrier 128 operates relative to a leftward side of system 110. As used herein, the terms "rightward" and "leftward" and the like shall be with reference to the rightward and leftward sides of system 110 as viewed in FIG. 6. During palletization, system 110 moves item layers 60 leftward.

A frame structure 120 supports therein build platform 18 and also supports a fixed-path actuation system 122. As discussed more fully hereafter, actuation system 122 operates in a single dimension, i.e., moves a lift head 24 carrying an item layer 60 along a fixed path whereby a single scalar value represents the position of an item layer 60 along this fixed path. More particularly, actuation system 122 carries lift head 24 along a fixed path between site 18' and pallet support site 126.

Frame structure 120 includes a base 150 and a set of vertical uprights 152a–152f each extending upward from base 150. A set of horizontal beams 154a–1 54d couple together upper ends of the vertical uprights 152 and a simple generally box-form frame structure results. More particularly, uprights 152a and 152f occupy a rightward position, uprights 152c and 152d occupy a leftward position, and uprights 152b and 152e occupy a mid-position intermediate the leftward and rightward sides of system 110. Beam 154a couples uprights 152a, 152b, and 152c. Beam 154b couples uprights 152c and 152d. Beam 154c couples uprights 152d, 152e, and 152f. Beam 154d couples uprights 152f and 152a.

Figure 7:
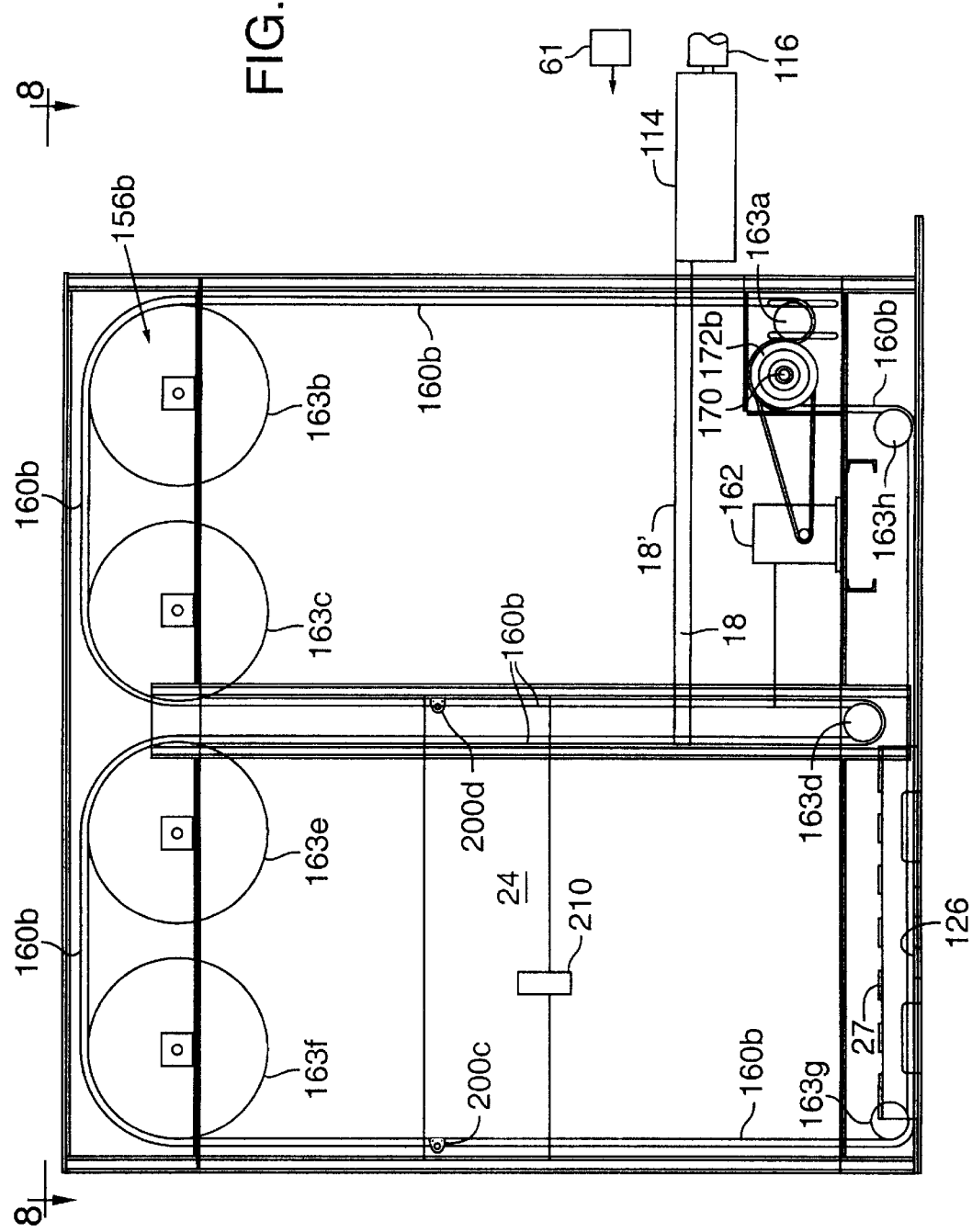
FIG. 7 illustrates a side view of the palletizer system of FIG. 6.
Figure 8:
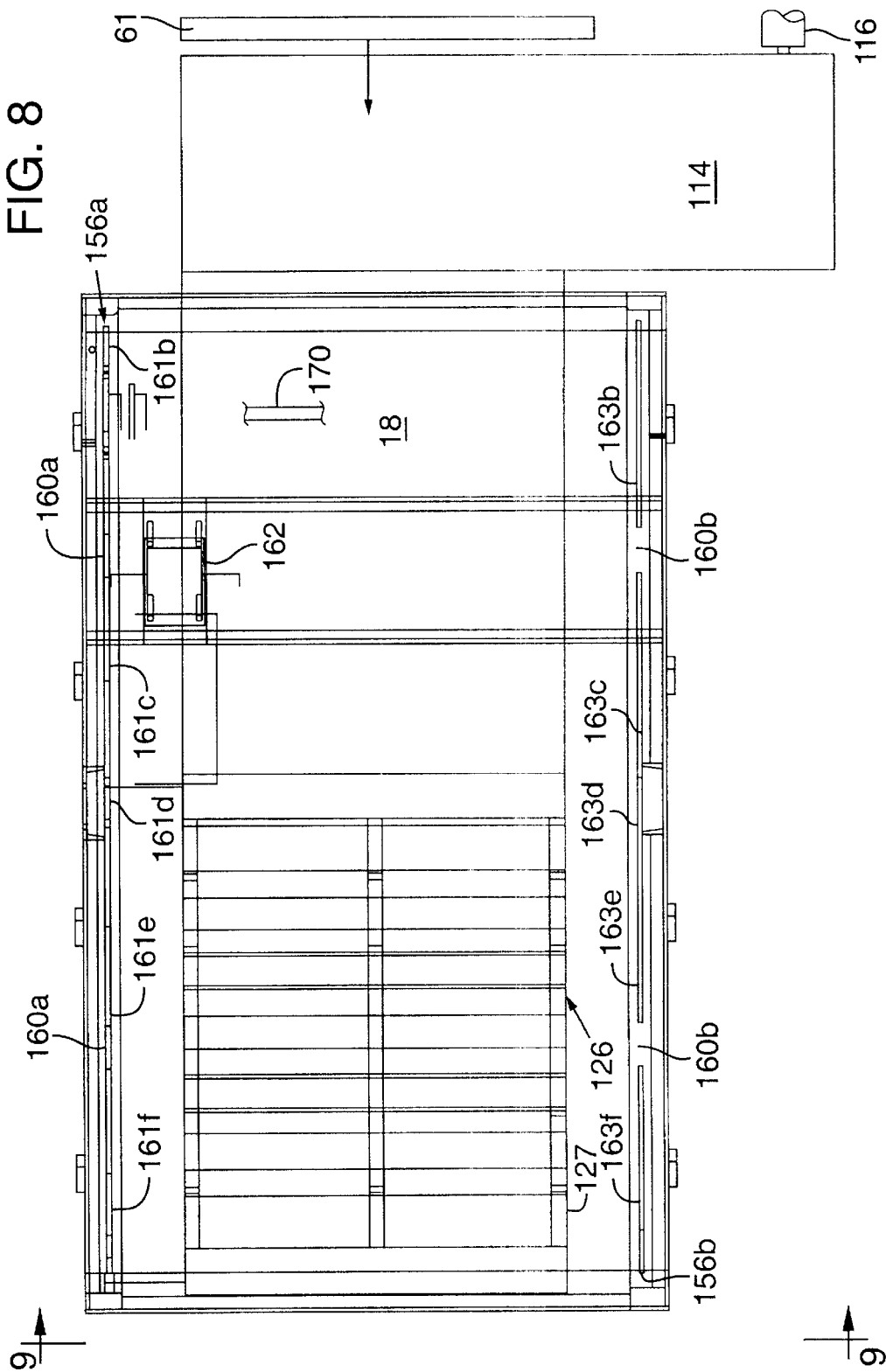
FIG. 8 is a top view of the palletizer system of FIG. 6 as taken along lines 8—8 of FIG. 7.
Figure 9:
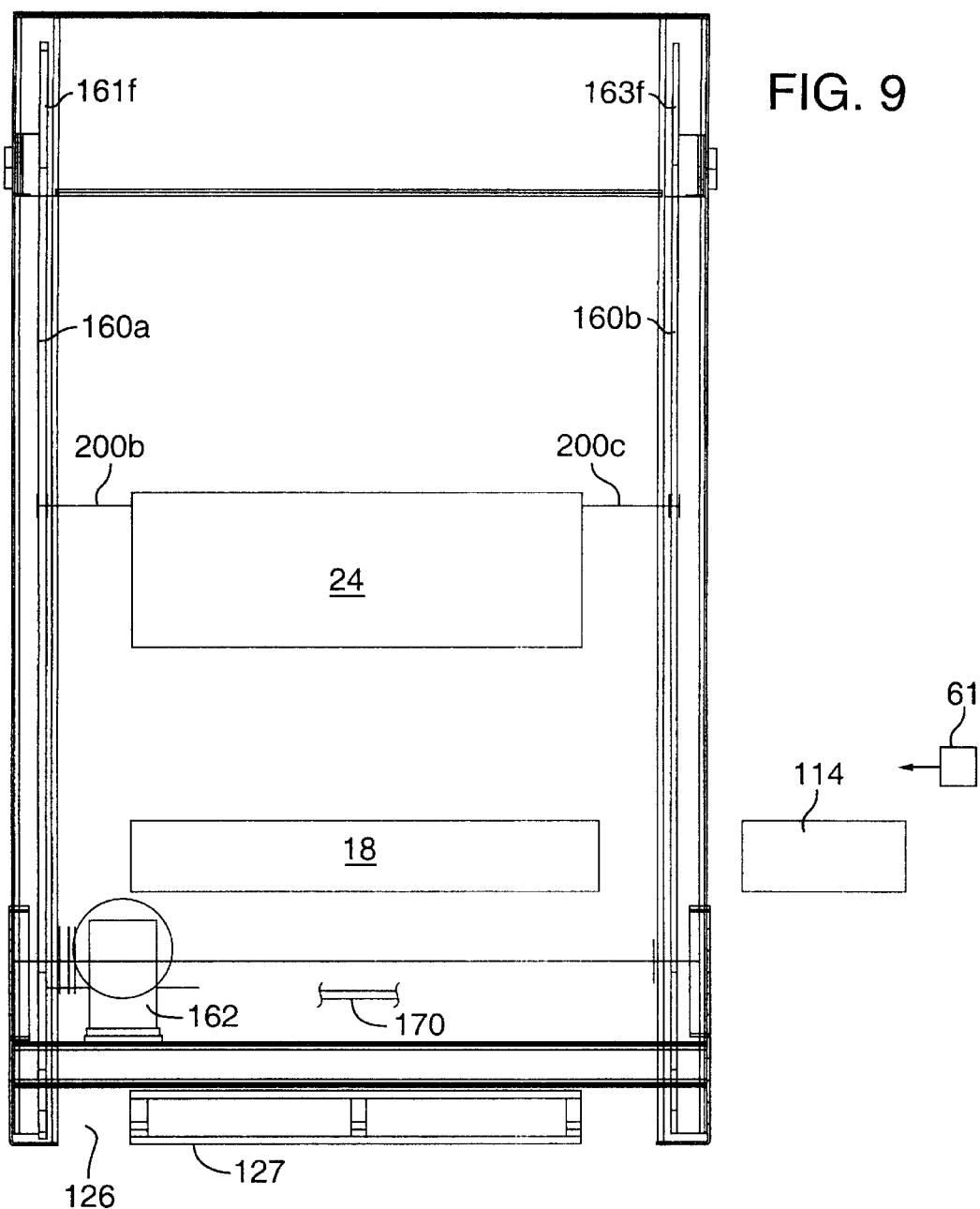
FIG. 9 is an end view of the palletizer system of FIG. 6 as taken along lines 9—9 of FIG. 8.

A pair of chain guides 156a and 156b each establish a "loop" guide path for a corresponding one of chains 160a and 160b, respectively, carried thereby. Chain guides 156a and 156b each include a series of idle sprockets 161 and 163, respectively. More particularly, chain guide 156a includes idle sprockets 161a–161h. Chain guide 156b includes idle sprockets 163a–163h. Idle sprockets 163a–163h, best viewed in FIG. 7, represent also the arrangement for idle sprockets 161a–161h with respect to support of chain 160a. While a specific configuration for chain guides 156 and for chains 160 are shown and illustrated, the present invention may be implemented by other geometric configurations including variation in chain guide path shape and number of chains employed.

While the use of chains and chain guides or pulleys has been shown, it will be understood that a variety of alternative mechanisms may be used such cables, cogged timing belts, and guide tracks establishing a fixed path of movement for a lift head. Accordingly, the terms "chains" and "chain guides" shall also refer to any such alternative mechanism.

Figure 10:
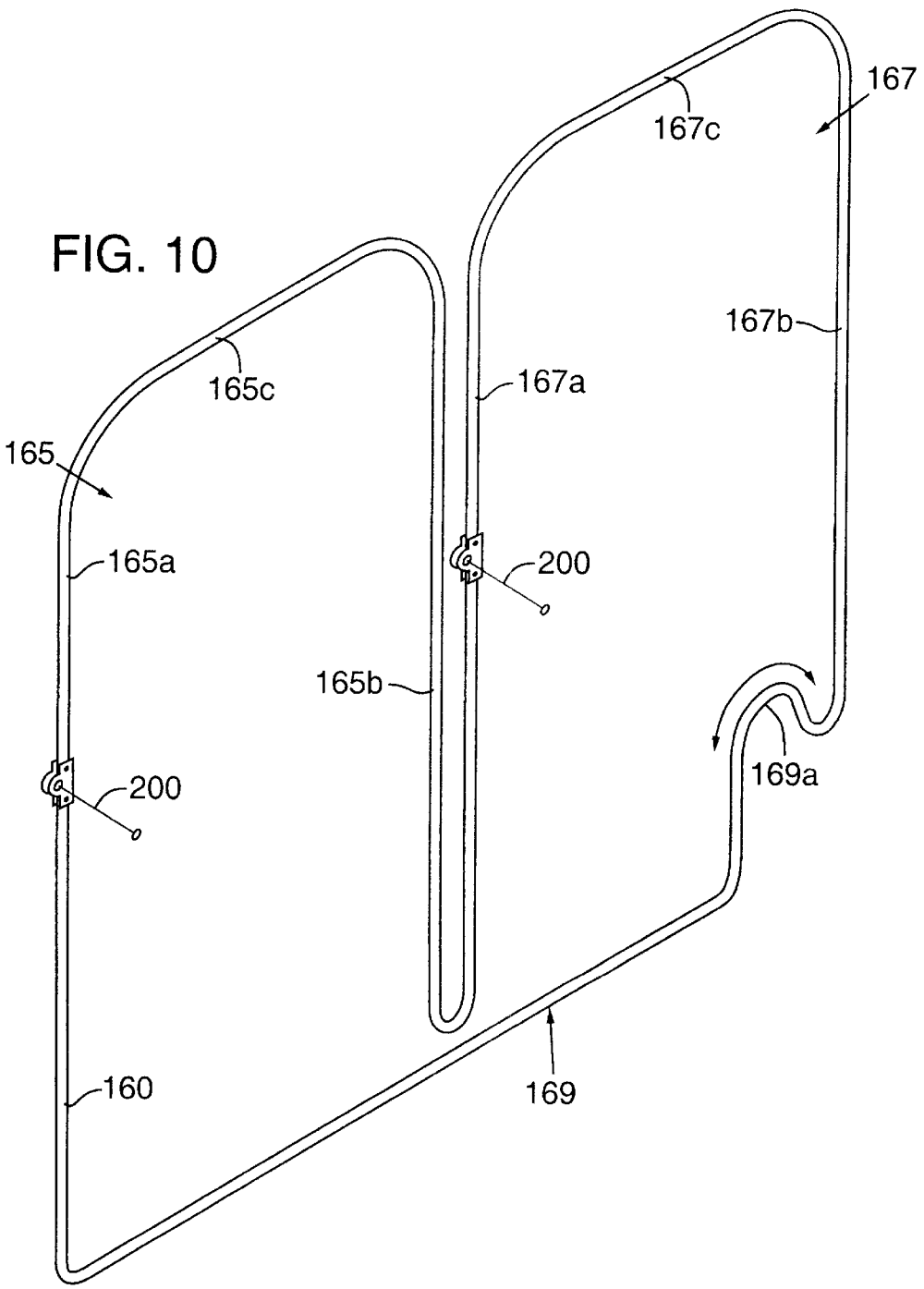
FIG. 10 illustrates a chain transport loop mountable within the palletizer system of FIG. 6.

FIG. 10 illustrates separately and in perspective one of chains 160. The illustrated shape of a chain 160 in FIG. 10 corresponds to that shape assumed when mounted on the corresponding guide 156 of system 110. Generally, each chain 160 follows a closed-circuit path as defined by the corresponding guide 156. The geometric configuration includes a leftward rectangular portion 165 and a rightward rectangular portion 167. Each of portions 165 and 167 include a most leftward vertical section 165a and 167a, respectively. Similarly, each rectangular portion 165 and 167 includes a most rightward vertical section 165b and 167b, respectively. Vertical sections 165a and 165b couple across an upper horizontal section 165c. Vertical sections 167a and 167b couple across a upper horizontal section 167c. Generally, sections 165a–165c form an inverted U-shape. Sections 167a–167c also form an inverted U-shape. Vertical sections 165b and 167a couple at idle sprocket 161d, in the case of chain 160a, and at idle sprocket 163d, in the case of chain 160b. Vertical sections 165a and 167b couple across a lower generally horizontal section 169 including a drive section 169a. Chains 160 carry lift head 24 via pins 200 and a reversible drive motor 162 couples to chains 160 at drive section 169a for movement of lift head 24 along a fixed path between sites 18' and 126. The reversible aspect of drive motor 162 allows bi-directional movement of lift head 24 along the fixed path between sites 18' and 126. By appropriately engaging and disengaging item layers 60 with lift head 24 while moving lift head 24 between sites 18' and 126, system 110 palletizes pallet stacks.

In the particular configuration of guides 156 and chains 160 illustrated herein, each of chain guides 156 define a similar geometric pattern, i.e., a pair of generally rectangular, but rounded corner, sections 165 and 167. Chains 160a and 160b are in face-to-face relation. Drive motor 162 couples to a drive shaft 170. Drive shaft 170 carries drive sprockets 172a and 172b. Sprockets 172a and 172b engage chains 160a and 160b, respectively at drive sections 169a. Thus, drive shaft 170 drives and synchronizes chains 160a and 160b. The geometric pattern for each of the chain guides 156 is identical such that corresponding links or points including pins 200 on each of the chains 160 move in identical direction, i.e., along identical but offset paths.

Support pins 200a–200d couple lift head 24 to chains 160. More particularly, pins 200a and 200b couple lift head 24 to chain 160a and pins 200c and 200d couple lift head 24 to chain 160b. Pins 200 mounted to a given chain 160 occupy similar locations on rectangular portions 165 and 167, respectively. For example, pin 200a occupies vertical section 167a while pin 200b occupies vertical section 165a. Similarly, as pin 200a moves onto horizontal section 167c, pin 200b moves onto horizontal section 165c. In this manner, synchronized movement of chains 160 causes similar but offset movement of pins 200, and therefore movement of lift head 24 along a fixed path between sites 18' and 126. Pins 200 thereby provide vertical support for lift head 24 relative to chains 160, but must allow relative rotation therebetween. Thus, pins 200 may be fixed relative to either lift head 24 or to the corresponding one of chains 160, but must allow rotation relative to the other. During operation of motor 162 and synchronized movement of chains 160, lift head 24 assumes and maintains a horizontal orientation while moving along a fixed path between sites 18' and 126.

Upon activation of motor 162, pins 200 move in unison along the fixed path selectively between sites 18' and 126. From the particular position illustrated in FIGS. 610, pins 200 move from above site 126 vertically upward and eventually reach an upper position along guides 156 and then turn rightward along rounded portion of guides 156. Pins 200 then move in unison horizontally rightward. Eventually, pins 200 reach the rightward end of the upper horizontal portion of the corresponding guides 156 and move downward along a rightward vertical portion of the corresponding chain guide 156 over site 18'. Reversing drive motor 162 causes similar, but opposite, movement of pins 200 and lift head 24.

Thus, system 110 uses a single actuation mechanism operating in one dimension, i.e., bi-directional movement of lift head 24 along a fixed path, between sites 18' and 126. While additional chains or motors could be employed, e.g., a separate motor for each chain loop 160, synchronization in movement of the chains 160 and pins 200 establishes a unified or single actuation system 122. As a result, a simple control scheme including start, stop and directional control relative to motor 162 satisfies necessary movement of lift head 24 in palletizing operations.

Lift head 24 carries a detector 210 (shown schematically in FIG. 7) indicating a given vertical separation between lift head 24 and a support surface therebelow, i.e., a surface at which a given layer 60 is to be placed or a surface at which a given layer 60 rests prior to engagement by lift head 24. Because items may vary in vertical dimension, the distance between lift head 24 and an appropriate support surface therebelow, e.g., site 18' or the upper surface of a stack of layers 60 at site 126, varies. Thus, detector 210 can be a simple limit switch adjustable in vertical position upon head 24 to account for the particular vertical dimension of items to be pal letized. As may be appreciated, however, detector 210 can be a more sophisticated, e.g., mechanical plunger or general purpose distance-reading, device providing data indicating actual separation between lift head 24 and a given placement or picking surface. Furthermore, an encoder may be employed to specify in linear fashion, i.e., provide a single scalar value for, the position of lift head 24. Because this is a one-dimensional actuation system, i.e., movement along a fixed path, a single scalar value indicates the location of lift head 24 along that fixed path. In the preferred embodiment of the present invention, detector 210 is an optical device detecting when lift head 24 has reached a given position relative to an appropriate support surface therebelow, i.e., a position appropriate for either engaging or releasing an item layer to be picked up or deposited, respectively, at support surface therebelow.

With chains 160 in appropriate synchronization as illustrated and with lift head 24 appropriately mounted thereupon via pins 200, activation of drive motor 162 in a first direction moves lift head 24 along the fixed path toward site 18' while operation of motor 162 in the opposite direction moves lift head 24 along the fixed path toward site 126.

Figure 11:
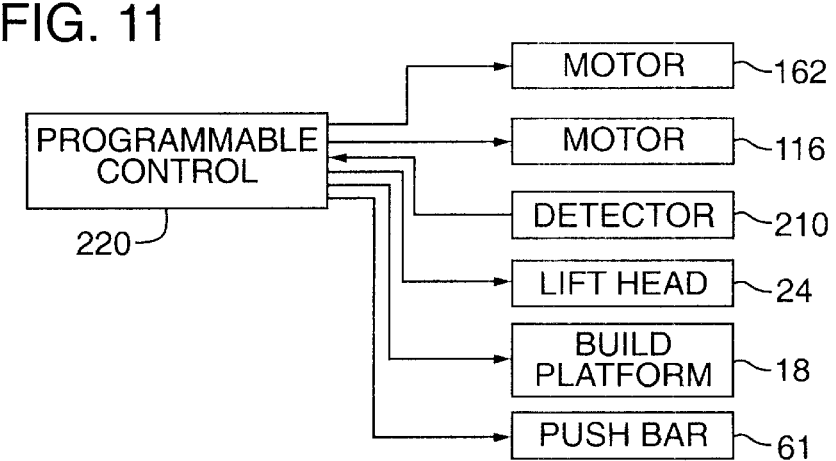
FIG. 11 illustrates by block diagram a control arrangement for the palletizer system of FIG. 6.

A programmable control 220 (FIG. 11) couples to the various components of system 110 to implement automated palletization. Programmable control 220 operates drive motor 162 to move lift head 24 in a selected direction along the fixed path coupling sites 18' and 126. Programmable control 220 also receives from detector 210 indication of the relative spacing between lift head 24 and a support surface therebelow, e.g., site 18' or the top layer 60 in a pallet stack at site 126. As lift head 24 approaches site 18' with an item layer 60 thereat, detector 210 eventually indicates to programmable control 220 suitable position in relation to site 18', and therefore the upper surface of the item layer 60 then present at site 18'. In response, programmable control 220 halts operation of drive motor 162. Programmable control 220 then activates lift head 24 and build platform 18 as described above to engage the layer 60 present at site 18'. Once engaged, programmable control 220 reverses operation of drive motor 162. Lift head 24 then moves upward along with the item layer 60 just taken from site 18', moves horizontally to a position over site 126, and then moves vertically downward toward site 126 until detector 210 indicates to programmable control 220 that the item layer 60 engaged by lift head 24 has reached a point just above a support level, i.e., just above a pallet if this is the first layer 60 placed or just above the top item layer 60 presently resting on a pallet at site 126. Programmable control 220 then instructs lift head 24 to release the item layer to be placed at site 126. By receiving an appropriate sequence of layers 60 at site 18', system 210 thereby stacks such layers on a pallet at site 126.

The radius of the upper idle sprockets, i.e., sprockets 161b, 161c, 161e, 161f, 163b, 163c, 163e, and 163f, determines the continuity of transition between vertical and horizontal movement for lift head 24. By providing "oversized" radii for these idle sprockets, lift head 24 undergoes a smooth transition between vertical and horizontal movement. The greater the radii in these idle sprockets, the smoother the transition between vertical and horizontal movement for a given item layer carried by lift head 24.

Chain guide geometry should provide vertical movement of lift head 24 directly above site 18' and above site 126. The length of vertical movement above site 126 varies as a function of the height of a stack of layers allowed on a pallet. In other words, lift head 24 movement should be vertical just prior to layer placement or layer collection and the extent of vertical movement established by system 110 should accommodate overall vertical variation in pallet stack height allowed.

The overall size of palletizer system 110 is generally more compact than other palletizing and/or de-palletizing systems. The overall compact size of system 110 creates a more desirable shipping configuration for system 110 and thereby reduces cost of delivery to a remote site. The vertical height of system 110 corresponds generally to the maximum allowed height for a stack of item layers on a pallet 127 plus an allowance for the upper curved portion, i.e., rounded corners, of the fixed path. As discussed above, an exaggerated or increased radius path in transition between vertical and horizontal movement smoothes the transition and decreases the likelihood of a loss of item layer engagement.

Furthermore, because system 110 defines a generally box-form structure incorporation of additional safety barriers, e.g., clear plastic walls (not shown), comes at small marginal cost relative to incorporation of such safety features in conventional palletizing and/or de-palletizing equipment. More particularly, system 110 may be made less hazardous to workers by mounting wall structures to frame 120. In conventional palletizing and/or de-palletizing systems, no such frame structure exists and incorporating such safety walls comes a relatively greater marginal expense.

Figure 12:
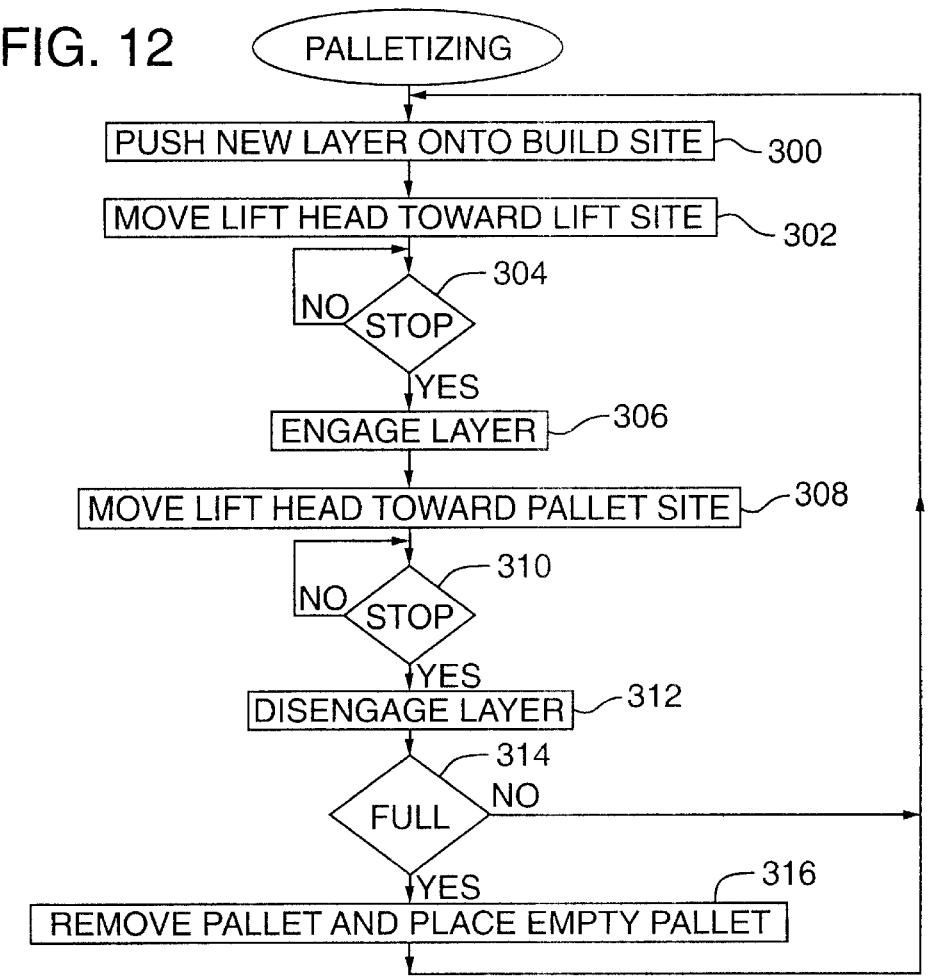
FIG. 12 illustrates by flow chart a palletizing operation performed by the system of FIG. 6.

FIG. 12 illustrates by flow chart a control scheme used during a palletizing operation. In FIG. 12, processing begins in block 300 where programmable control 220 operates transport system 112, i.e., transport 114 and push bar 61, to move a new item layer 60 onto site 18'. In block 302, programmable control 220 moves lift head 24 toward site 18'. As may be appreciated, the operation of block 302 can be conducted concurrently with the operation of block 300, but leaving lift head 24 sufficiently above stationary site 18' to allow placement of the new item layer at site 18'. Processing loops at decision block 304 until lift head 24 has been moved to an appropriate position relative to site 18' to engage the item layer now resting at site 18'. In other words, lift head 24 moves downward until detector 210 indicates to programmable control 220 that downward movement may stop. In block 306, lift head 24 engages the item layer at site 18' as described above. More particularly, programmable control 220 first operates drive motor 34 until the trailing roller tube 32a reaches the edge of pallet layer 60 most distant from stop plate 58. Once so positioned, programmable control 220 operates drive motor 52 to advance the leading roller tube 46a into position just behind the trailing roller tube 32a. Drive motors 34 and 52 are then operated concurrently to pass support for the item layer 60 from build platform 18 to lift head 24 as described above and illustrated in FIGS. 3A–3D.

In block 308, programmable control 220 moves lift head 24 and the item layer 60 carried thereby toward pallet site 126 along the fixed path as described herein. In other words, programmable control 220 activates in reverse direction drive motor 162 and lift head 24 moves upward, horizontally rightward as viewed in FIG. 6, and downward toward site 126. Processing loops at decision block 310 until detector 210 indicates to programmable control 220 that lift head 24 has achieved an appropriate position for releasing the item layer 60, i.e., has brought the item layer 60 to a position just above a pallet 127 at site 126 or just above the top layer 60 of a stack of layers 60 on a pallet 127 at site 126. In block 312, programmable control 320 instructs lift head 24 to release the layer. More particularly, programmable control 220 activates drive motor 52 to move roller tubes 46, presently supporting the item layer 60, toward stop plate 58. Eventually, roller tubes 46 move out from under layer 60 and layer 60 drops to the support surface therebelow, i.e., drops onto a pallet at site 126 or onto the top layer 60 of a stack of item layers 60 on a pallet at site 126. Lift head 24 then returns in a direction toward site 18'. Also, while lift head 24 is moving a given layer 60 toward site 126, programmable control 220 can move a next item layer 60 on to site 18'.

In block 314, programmable control 220 determines whether the pallet presently at site 126 is full. For example, if an encoder device is used to detect the position of lift head 24 then the height of a stack of layers 60 on a pallet at site 126 may be inferred from chain position. Other pallet stack height detection devices may be used to indicate to programmable control 220 when a given pallet is full. If the pallet is not full, then processing returns from decision block 314 directly to block 300. Otherwise, processing passes through block 316 where pallet carrier 128 removes the full pallet 127 from site 126 and places an empty pallet 127 at site 126. As may be appreciated, pallet carrier 128 could be an automated device operating under the direction of programmable control 220 or be a forklift 128 operated in conjunction with system 110 operation.

While a variety of chain shapes and number of chains and support arrangements establishing guide paths may be established, generally pins 200 should move in similar but offset paths to establish a fixed path of movement for lift head 24 between sites 18' and 126. Accordingly, it will be appreciated that the present invention is not limited to a particular number of chains or particular chain geometry.

Despite an extremely simple control mechanism, i.e., a one dimensional fixed path bi-directional motor control, pallet layers 60 enjoy a smooth transition from build platform 18 to lift head 24 and enjoy a smooth ride in transition between sites 18' and 126. Achieving such smooth transitions in an x-y positioning system, e.g., overhead crane and lift apparatus, requires relatively complex coordination between x movement and y movement.

Figure 13:
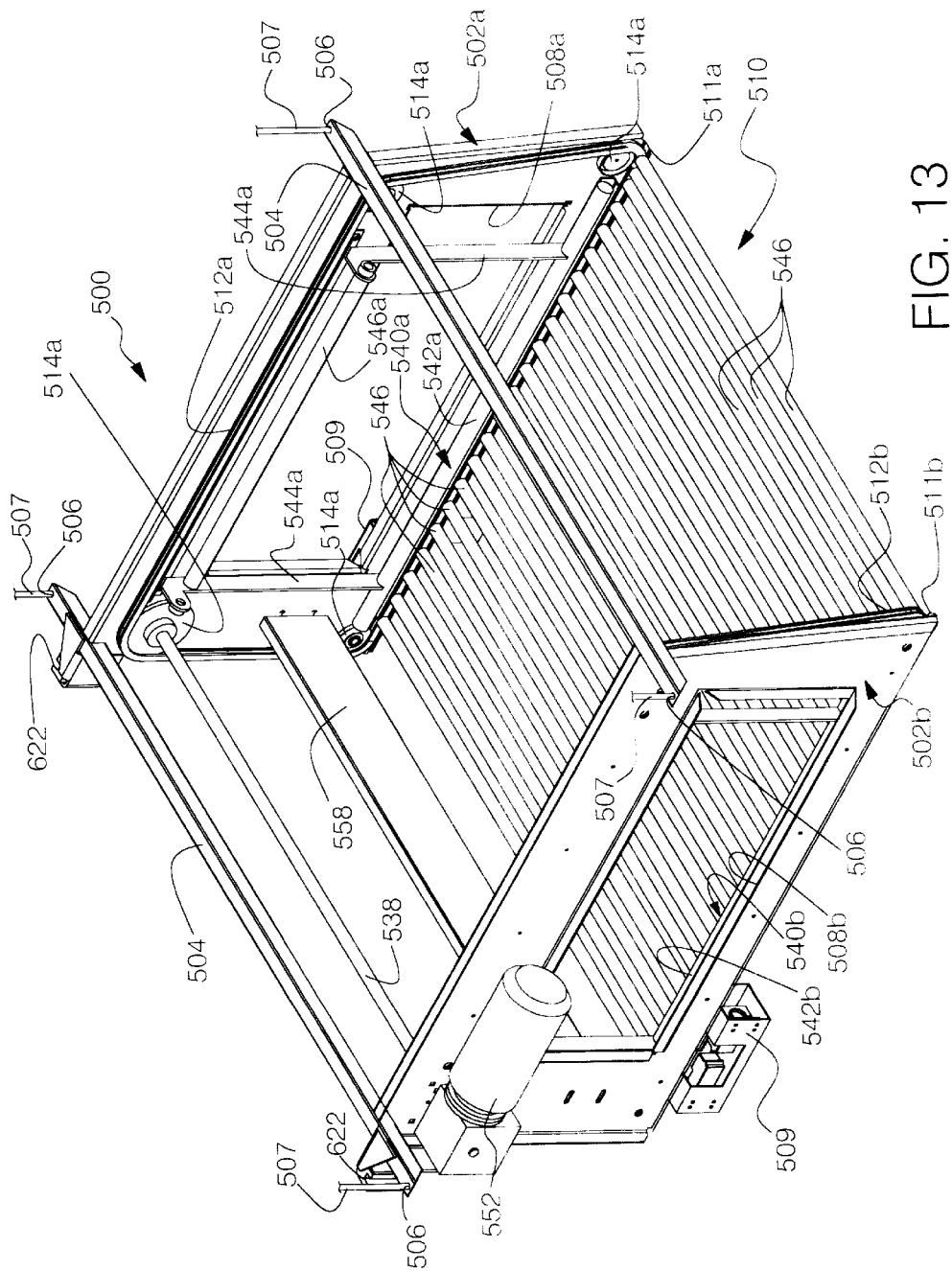
FIG. 13 illustrates in perspective an alternative carriage adaptable for use in a variety of configurations including stationary mounting and a vertical reciprocation.

FIG. 13 illustrates a carriage 500 which may be used in a variety of applications including a substitute for the lifthead 24 in palletizer system 10 carriage 500 interacts with a build table 18 as described above for passing a layer from the build site 18' onto the carriage 500. Carriage 500 then moves from a pick place, i.e., build site 18', to a placement site, e.g. pallet 128, as described above. Thus, it will be understood that the carriage 500 may be substituted in the palletizer system 10 in place of the lifthead 24. The following discussion, however, will focus on use of the carriage 500 in a separate "tower" palletizer configuration.

In FIG. 13, carriage 500 includes a pair of side frames 502, individually 502a and 502b, of similar shape and in spaced face-to-face orientation. Side frames 502 couple to form a generally box-form rigid structure, e.g., couple as by cross bars 504 and by stop plate 558. Each of cross bars 504 provide a pair of mount sites 506. Thus, when using carriage 500 as a substitute for the lifthead 24 as described above, the four mount sites 506 attach to corresponding ones of the four pins 200 whereby carriage 500 moves along the fixed path between site 18' and site 126. In a vertically reciprocating configuration described more fully below, each of mount sites 506 attach to a chain 507 whereby carriage 500 is suspended from chains 507 and vertical reciprocation is accomplished by means of chains 507. In a stationary configuration also described more fully below, mount sites 506 attach to a stationary portion of a surrounding framework.

Each side frame 502 includes an opening 508 of sufficient size to allow insertion therethrough of a given row of items to be placed within carriage 500 in constructing an item layer thereon. Carriage 500 is open at its front 510 and is of sufficient size thereacross to also receive a row of items when constructing a layer of items within carriage 500. Thus, carriage 500 can receive rows of items from any of three directions, i.e., through one of openings 508 or front opening 510 In this regard, carriage 500 is designed for adaptation to a variety of particular installations, i.e., may be incorporated without modification regardless of the direction of infeed for a particular system. As described above, infeed is accomplished by use of a push bar shoving individual rows of items through a selected opening in carriage 500 thereby constructing a layer organized as rows of items.

Carriage 500 includes a pair of chains 512, individually 512a and 512b. Each of chains 512 assume a generally rectangular configuration surrounding a corresponding one of openings 508. A set of four supporting sprockets 514a mount to side frame 502a and carry chain 512a about its generally rectangular path surrounding opening 508a. A similar set of sprockets 514b (only one shown partially in FIG. 13) mount to side frame 502b and support chain 512b in its generally rectangular path about opening 508b. While not visible in the view of FIG. 13, it will be understood that sprockets 514b mount in similar fashion and carry chain 512b as do sprockets 514a carry chain 512a in relation to side frame 502a. A pair of support shelves 511, individually 511a and 511b, run along the lower inner edges of side frames 502a and 502b, respectively. Shelves 511 support the corresponding chains 512 along a flat guide path defining a floor plane of carriage 500. A drive motor 552 couples to a drive shaft 538 which in turn couples to one of sprockets 514a and to one of sprockets 514b (not shown). Thus, activation of drive motor 552 causes coordinated movement of chains 512.

A set of roller tubes 546 couple chains 512a and 512b. Roller tubes 546 occupy successive positions along corresponding portions of chains 512a to define a moveable, flexible platform within carriage 500. Roller tubes 546 occupy only a portion of the length of chains 512. Activation of drive motor 552 selectively positions the set of roller tubes 546 as desired. Thus, by actuating drive motor 552 the roller tubes 546 carried on chains 512 move in unison following the generally rectangular path of chains 512 including the floor portion of carriage 500 as defined by shelves 511. As illustrated in FIG. 13, roller tubes 546 are positioned across the floor of carriage 500 whereby a layer of items may be pushed into carriage 500 and supported thereon. To drop a layer of items from carriage 500, drive motor 552 actuates to move roller tubes 546 from their "floor" position as illustrated in FIG. 13 toward stop plate 558. As the set of roller tubes 546 move under the item layer and withdraw support, the items bear against stop plate 558 and eventually drop from carriage 500. As may be appreciated, carriage 500 is first suitably positioned relative to another supporting surface, e.g., such as a pallet 126 or a preceding item layer on a stack of layers on a pallet 126. As described more fully hereafter, however, carriage 500 may be operated in a stationary position and perform a "hand off" operation to a separate transport carriage responsible for moving the layer to its destination placement site.

Carriage 500 includes a pair of sensors 509 suitable for detecting the position of carriage 500 relative to, for example, a support surface therebelow for depositing a layer of items thereon, its position relative to a surrounding framework, or the position of a separate transport carriage moving into position to accept a layer of items from carriage 500.

Carriage 500 includes a pair of centering clamps 540, individually clamp 540a pivotally mounted to the inner face of side frame 502a and centering clamp 540b similarly pivotally mounted to the inner face of side frame 502b. While not fully illustrated in FIG. 13, it will be understood that centering clamp 540b mounts in similar relation to side frame 502b as does centering clamp 540a to side frame 502a. Each centering clamp 540 includes a push bar 542a suspended at the distal end of pivot arms 544. The proximal end of pivot bars 544 mount in rotatable fashion to the inner face of side frame 502. In this manner, each assembly of push bar 542, pivot arms 544, and pivot axle 546 form a generally rectangular structure surrounding a corresponding opening 508. Actuation of centering clamps 540 rotates pivot arms 544 about axis 546 causing push bars 542 to move inward toward the center of carriage 500. By actuating both centering clamps 540 simultaneously, as described more fully hereafter, a layer of items then resting upon roller tubes 546 become centered in a dimension parallel to push bars 542. Subsequently, when the layer of items is removed from carriage 500 by urging the layer of items against stop plate 558, the layer of items is fully collapsed in a dimension parallel to stop plate 558. Thus, a layer of items pushed into carriage 500 row-by-row becomes compact and well organized by virtue of operation of centering clamps 540 followed by urging of the layer of items against stop plate 558. As a result, an organized and compact layer of items results.

Figure 23A:
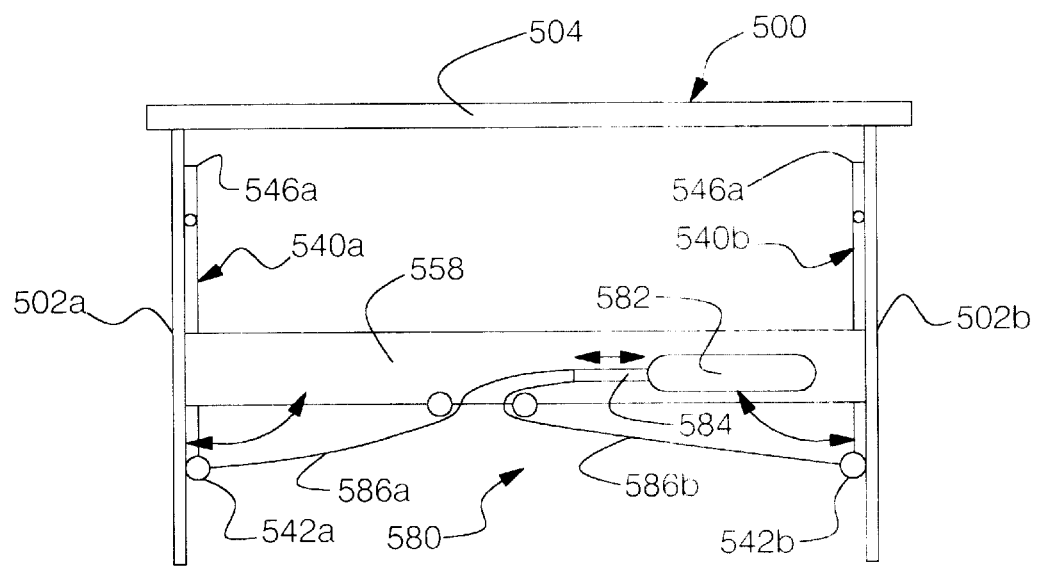
FIGS. 23A and 23B illustrate a mechanism for actuating centering clamps of the carriage of FIG. 13.
Figure 23B:
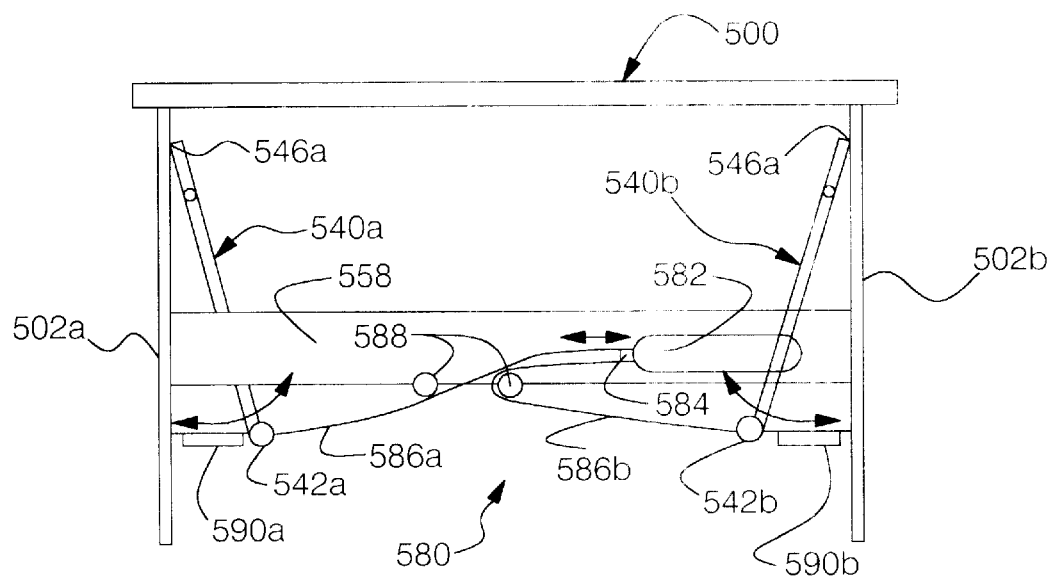

FIGS. 23A and 23B illustrate a mechanism for actuating the centering clamps 540 of carriage 500. FIGS. 23A and 23B illustrate carriage 500 from a rear view relative to that illustrated in FIG. 13. Also, FIGS. 23A and 23B illustrate schematically the carriage 500 for the purpose of illustrating a centering clamp actuator 580. Centering clamp actuator 580 includes a bi-directional pneumatic cylinder 582. The distal end of cylinder shaft 584 couples to a first end of tension cable 586a and to a first end of tension cable 586b. The other end of tension cable 586a couples to push bar 542a and the other end of tension cable 586b couples to push bar 542. Each of cables 586a and 586b pass between idle wheels 588 mounted to stop plate 558. Cylinder 582 remains in a normal position as illustrated in FIG. 23A with the shaft 584 extended. Upon actuation of cylinder 582, however, shaft 584 retracts as illustrated in FIG. 23B and applies tension to cables 586a and 586b. As a result, centering clamps 540a move inward. A pair of return springs 590, individually 590a and 590b, couple each push bar 542 to the inner face of the corresponding sideplate 502. Thus, upon retraction of shaft 584, i.e., deactivating cylinder 582, return springs 590 pull centering clamps 540 to their normal position as illustrated in FIG. 23A.

While described as a centering device, centering clamps 540 may be modified to selectively position a load laterally within carriage 500 by adjustment in the tension allowed in cables 586. More particularly, the relative length of cables 542 determines the final position for a load positioned by centering clamps 540. For a given length of cables 586, a centering function for a layer of items occurs. By adjusting each cable relative to this given length, however, selected lateral positioning results. For example, by making cable 586a slightly longer relative to its given length, the resulting position of a layer of items is closer to centering clamp 540a than centering clamp 540b. A similar offset final position may be accomplished by relative adjustment in cable 586b relative to its given length.

Figure 14:
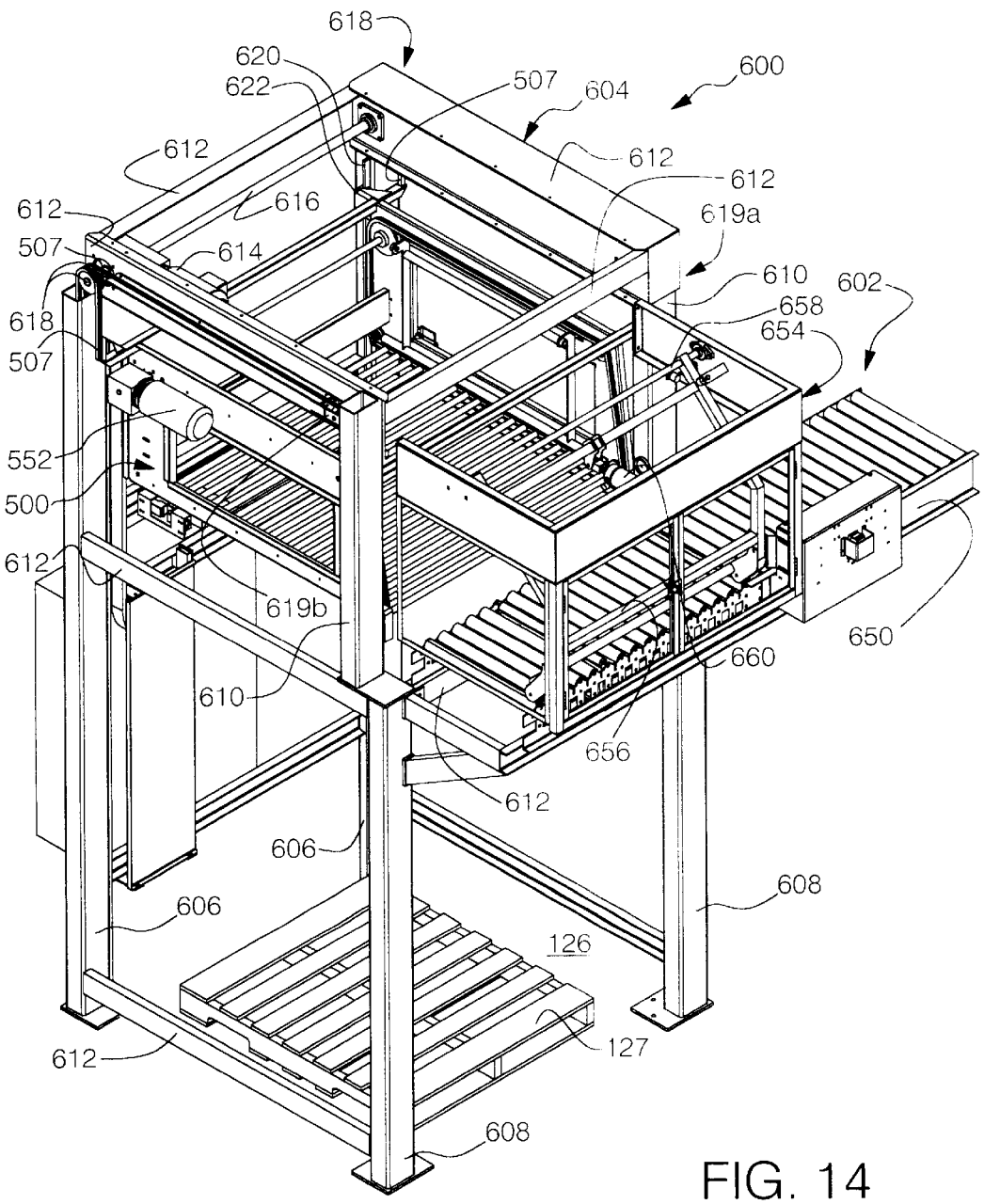
FIG. 14 illustrates a tower palletizing system making use of the carriage of FIG. 13 in vertically reciprocating mode.

FIG. 14 illustrates a palletizer system 600 provided in a "tower" configuration with a vertically-reciprocating carriage 500. The tower configuration of system 600 includes a high-infeed 602 adjacent an upper position for carriage 500. With carriage 500 positioned as illustrated in FIG. 14, i.e., at its upper position, and with roller tubes 546 located in their "floor" position as illustrated in FIG. 14, a layer of items may be constructed within carriage 500 by pushing items row-by-row into carriage 500 and upon roller tubes 546. Centering clamps 540 move inward to collapse and center the layer within carriage 500. Once a layer has been built upon carriage 500, system 600 moves carriage 500 downward to an appropriate vertical position, i.e., directly above a pallet 126 or an upper-most layer of a stack of layers on pallet 126, and thereafter releases the layer for placement thereon. To release the layer, carriage 500 actuates drive motor 552 to pull roller tubes 546 from their floor position and urge the layer against stop plate 558. Eventually, the roller tubes 546 withdraw completely from under the layer and release the layer from carriage 500.

Carriage 500 then returns to its upper position, as illustrated in FIG. 14, where at another layer of items is constructed within carriage 500 upon the roller tubes 546. As may be appreciated, roller tubes 546 return to their "floor" position while carriage 500 returns to its upper position in preparation for receiving a next layer of items. Each new layer moves vertically downward for placement upon a stack of layers until pallet 126 includes a full stack of layers. Pallet 126 and the stack of layers thereon may then be removed from palletizer system 600 and a new, i.e., empty pallet, 126 is then placed below carriage 500 for a next iteration of palletizing.

In FIG. 14, palletizer system 600 includes a palletizer tower frame 604. Frame 604 includes rear vertical legs 606 resting directly upon a floor surface therebelow and extending substantially the height of frame 604. Front vertical legs 608 extend upward partially the height of frame 604 to the vicinity of the high infeed system 602. Upper vertical legs 610 extend upward from front legs 608 to the upper portion of frame 604. Cross bars 612 couple horizontally among the various legs 606, 608, and 610 to establish a rigid configuration for frame 604. Frame 604 defines a column of vertical space with the pallet 127 at the bottom and carriage 500 reciprocating vertically thereabove. Because layer building, layer transport, and layer stacking all occur within this vertical space directly above pallet 127, system 600 occupies minimal floor space, i.e., sufficient floor space for pallet 127 and legs 606 and 608 thereabout.

A transport drive motor 614 mounts at an upper portion of frame 604 and couples to a transport drive shaft 616. Each end of drive shaft 616 carries a pair of sprockets 618. In the view of FIG. 14, only two sprockets 618 are visible on the left end of shaft 616, but a corresponding pair of sprockets 618 are located at the opposite right end of shaft 616. Each of sprockets 616 carries one of chains 507. Forward idle sprockets 619, individually 619a and 619b (619a not visible in FIG. 14) carry on each side of tower 604 one of chains 507 to a forward location on frame 604. These two chains 507 thereby depend at a forward location from idle sprockets 619a and 619b. The other two chains 507 depend directly from the corresponding drive sprockets 16 at a rear portion of frame 604. Thus, the four chains 507 depend from four locations, i.e., the four corners, of frame 604 in position directly above the mount sites 506 of carriage 500. One end of each chain 507 couples to a mount site 506 of carriage 500. One or more counter weights (not shown) attach to the other ends of chains 507 whereby upon actuation of drive motor 614 and rotation of drive shaft 612, carriage 500 as suspended from chains 507 moves vertically. Thus, operation of drive motor 614 in one direction raises carriage 500 and operation of drive motor 614 in the opposite direction lowers carriage 500. Each of rear legs 606 includes a vertical guide track 620 cooperative with corresponding guides 622 of carriage 500 to maintain carriage 500 along a given vertical path while suspended from chains 507.

Thus, it will be understood that carriage 500 may be selectively moved vertically within the vertical column of space of frame 604. Once a layer of items has been placed upon roller tubes 546, carriage 500 moves vertically downward to an appropriate vertical position whereupon drive motor 552 actuates to pull out from under the layer the roller tubes 546 and thereby deposit the layer at a selected support site therebelow, e.g., upon pallet 127 at place site 126 located on a floor structure surrounded by legs 606 and 608. Once the layer has been so deposited, drive motor 614 actuates in the opposite direction to raise carriage 500 while drive motor 552 concurrently activates to return roller tubes 546 into their "floor" position to receive a next layer of items from infeed system 602.

Infeed system 602 includes an infeed conveyor 650 receiving a series of items to be palletized. Infeed system 602 also includes as necessary conventional item metering and orientation apparatus to ensure appropriate orientation of items arriving via conveyor 650. Upon detecting an appropriate number of such items, infeed system 602 actuates item transfer device 654 to push a row of items onto carriage 500. Item transfer device 654 includes a push bar 656 mounted pivotally relative to a support bar 658. An actuator 660 pushes against the structure of push bar 656 to urge push bar 656 toward and into carriage 500. Thus, by positioning an appropriate number of items in front of push bar 656 and activating actuator 660, infeed system 602 pushes a row of items into carriage 500. Once a sufficient number of rows of items have been pushed into carriage 500, i.e., a layer has been built upon the roller tubes 546, system 600 moves the layer vertically downward for stacking.

While illustrated in FIG. 14 as pushing layers from infeed system 602 into the opening 510 (FIG. 13) of carriage 500, it will be understood that infeed system 602 may be located on the sides of carriage 500 to push layers into carriage 500 by way of side openings 508.

Figure 15:
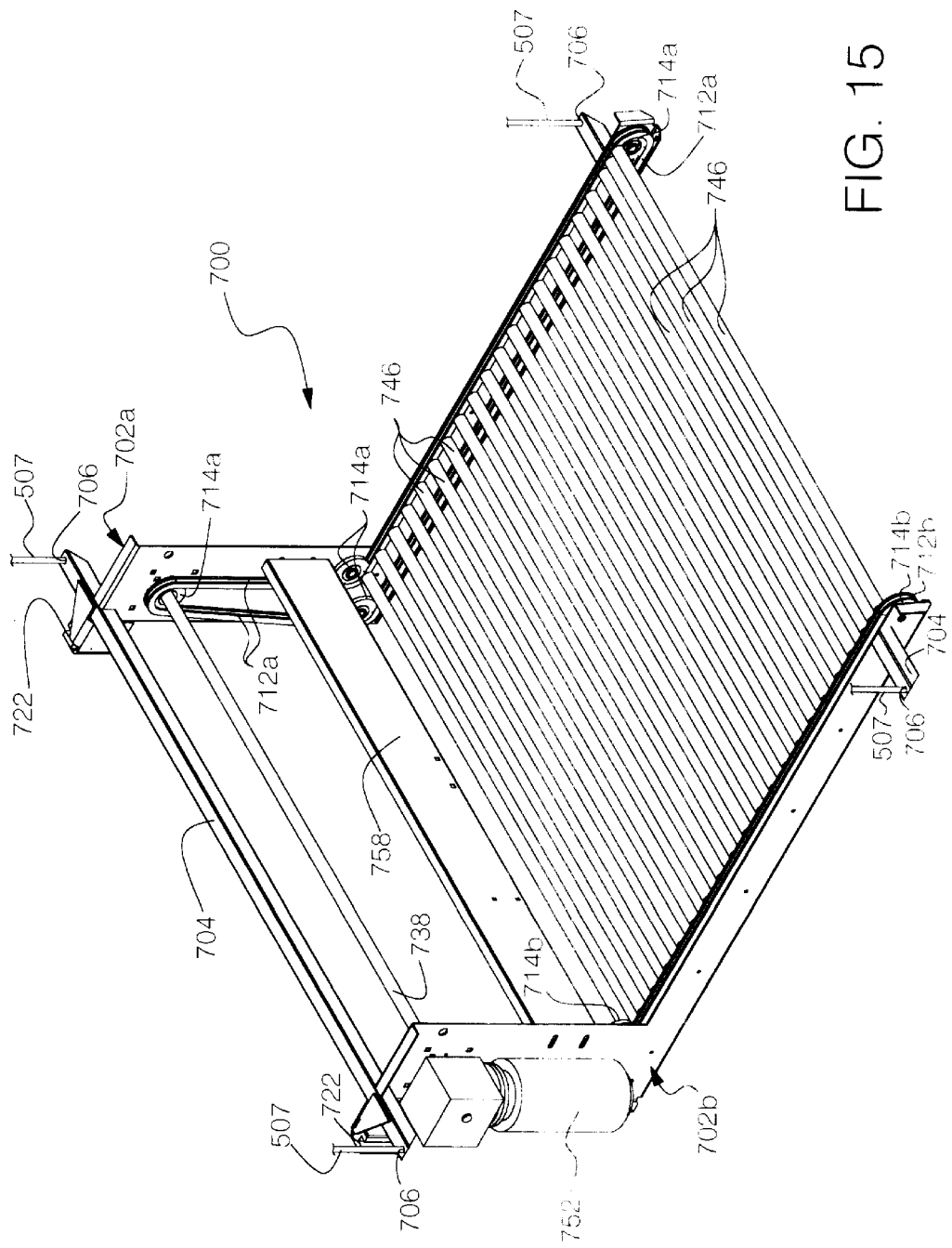
FIG. 15 illustrates in perspective an open floor L-shaped carriage.

FIG. 15 illustrates an alternative carriage 700 assuming a generally L-shaped open-floor configuration. Carriage 700 includes side frames 702, individually 702a and 702b. Side frames 702 are generally L-shaped including a vertical portion and a horizontal portion. Cross bars 704 rigidly couple side frames 702a and 702b. A stop plate 758 also further couples together side frames 702a and 702b and contributes to the overall rigidity and structural integrity of carriage 700. Each end of cross members 704 includes a mount site 706. As discussed more fully hereafter, carriage 700 hangs from chains 507 and vertically reciprocates during palletizing operations.

Each side frame 702 carries four sprockets 714, designated sprockets 714a as mounted to side frame 702a and sprockets 714b as mounted to side frame 702b. In the view of FIG. 15, all four sprockets 714a, as mounted to the inner surface of sideplate 702a, are visible. Sprockets 714b, as mounted to the inner surface of side plate 702, are partially or fully obscured but assume the same configuration in relation to side plate 702b as do sprockets 714a to side plate 702a. Each side plate 702 carries upon its corresponding sprockets 714 a chain 712, individually chain 712a and 712b. In the view of FIG. 15, chain 712b is almost fully obscured. However, chain 712b mounts upon sprockets 714b in similar fashion to that of chain 712a upon sprockets 714a as more fully visible in FIG. 15. A set of roller tubes 746 occupy corresponding portions of chains 712 whereby a moveable, flexible floor structure is established relative to carriage 700. A drive motor 752 mounts upon side frame 702b and rotates a drive shaft 738. Drive shaft 738 couples to one of sprockets 714a and to one of sprockets 714b (not visible in FIG. 15) Chains 712 thereby operate concurrently in unison.

Thus, operation of drive motor 752 moves the set of roller tubes 746 into and out of the "floor" position as illustrated in FIG. 15. More particularly, by actuating drive motor 752 to move roller tubes 746 toward stop plate 758, a layer of items resting upon roller tubes 746 bears against stop plate 758 and eventually roller tubes 746 move out from under the layer of items thereby dropping the items to a supporting surface therebelow. For example, a layer of items resting upon roller tubes 746 may be deposited upon a pallet 127 or upon a stack of items previously deposited upon a pallet.

Carriage 700 includes guides 722 similar to the guides 622 (FIGS. 13 and 14) of carriage 500 for maintaining carriage 700 in a given vertical path relative to a surrounding frame, e.g., relative to a frame 604 including vertical guide tracks 620. Thus, it will be understood that carriage 700 may be incorporated into frame 604 to vertically reciprocate during a palletizing operation. More particularly, carriage 700 may be moved to an upper position to receive a layer of items, e.g., such as from a stationary carriage 500, and then move vertically downward to deposit the layer of items upon a supporting surface, e.g., upon a pallet 127 or the top layer of a stack of items on a pallet 127.

FIGS. 16–20 illustrate a palletizer system 800 provided in a "tower" configuration. System 800 is similar to the previously-described system 600 in that it includes a high infeed system 602 and a frame 604 as described above. System 800 differs, however, in that the carriage 500 mounts in fixed position relative to frame 604 and carriage 700 hangs from cables 507 for vertical reciprocation within frame 604. In this configuration, carriage 500 operates as a pre-build table capable of dropping or passing a layer of items onto carriage 700. Once a layer of items has been pushed into carriage 500 by infeed system 602, centering clamps 540 laterally collapse the layer. The process of releasing the layer from carriage 500, i.e., pulling roller tubes 546 out from under the layer, collapses the layer in the other direction to establish a well ordered and compact layer for placement upon the roller tubes 746 of carriage 700. Once a layer of items has been deposited upon carriage 700, carriage 700 moves vertically downward and thereafter releases the layer upon a pallet 127 or upper layer of a stack of layers upon a pallet 127.

Figure 16:
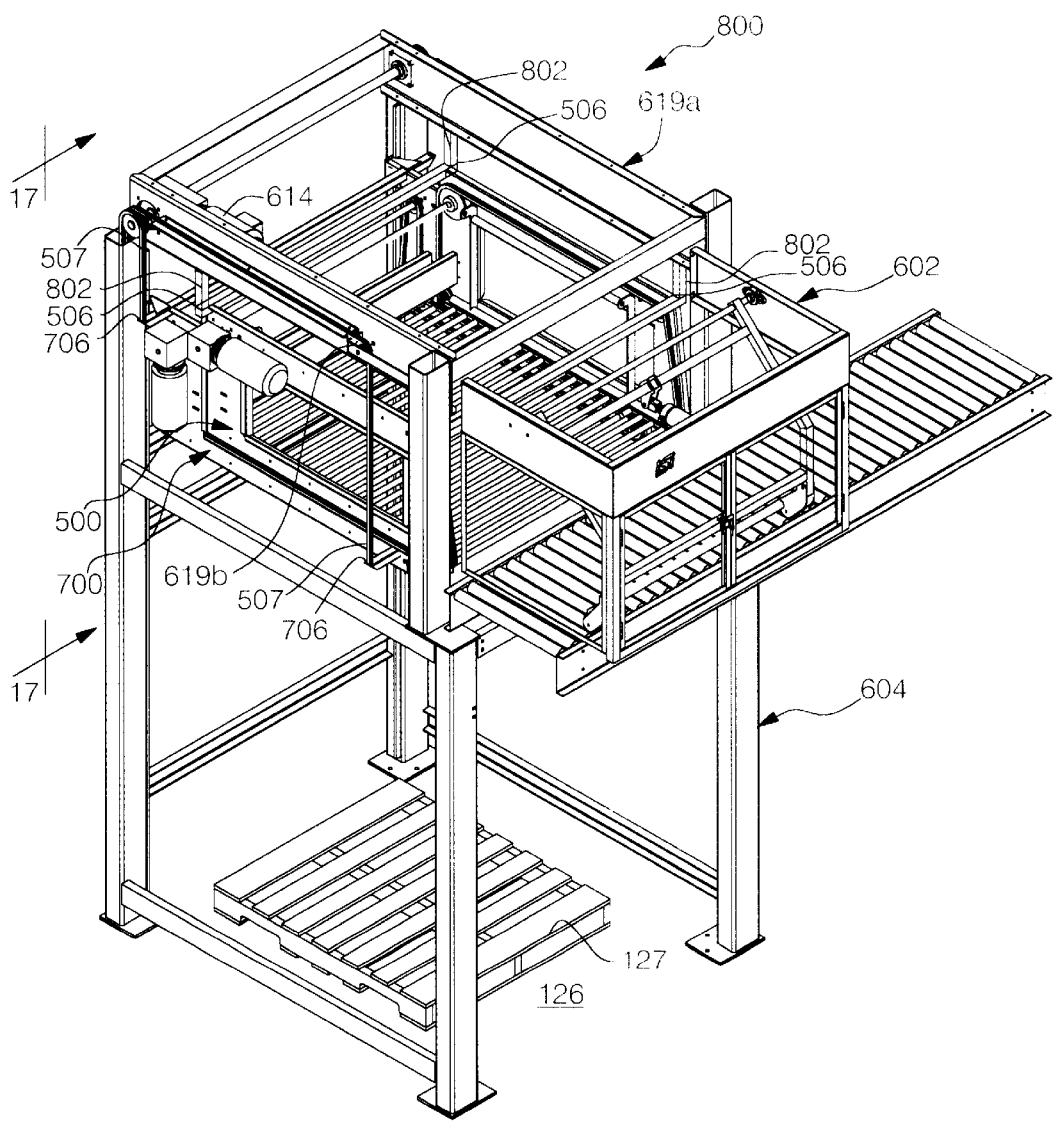
FIG. 16 illustrates a palletizer system making use of the carriage of FIG. 13 in a stationary configuration and the carriage of FIG. 15 in a vertically reciprocating configuration.
Figure 17:
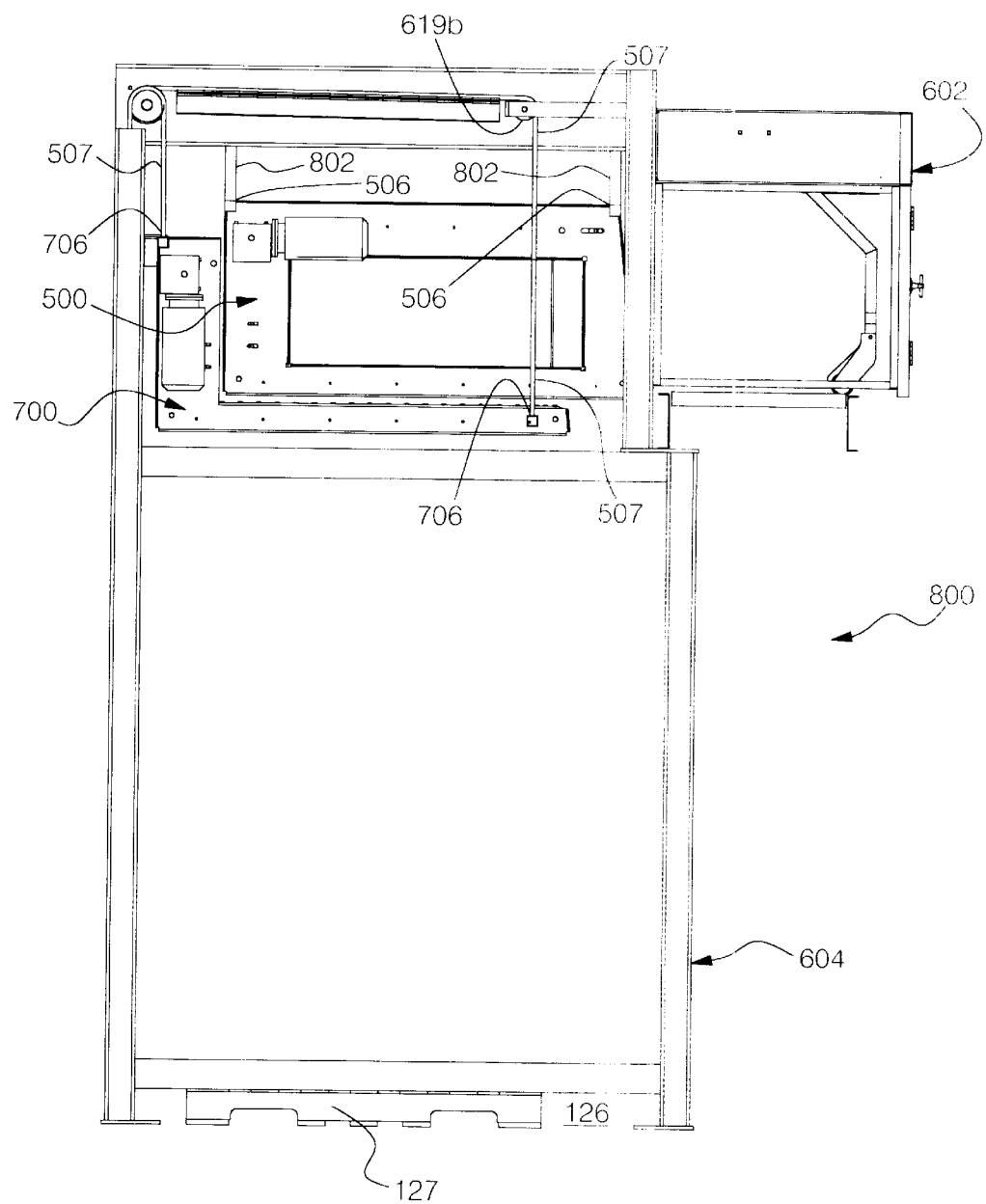
FIG. 17 illustrates the palletizer system of FIG. 16 as taken along lines 17—17 of FIG. 16.
Figure 18:
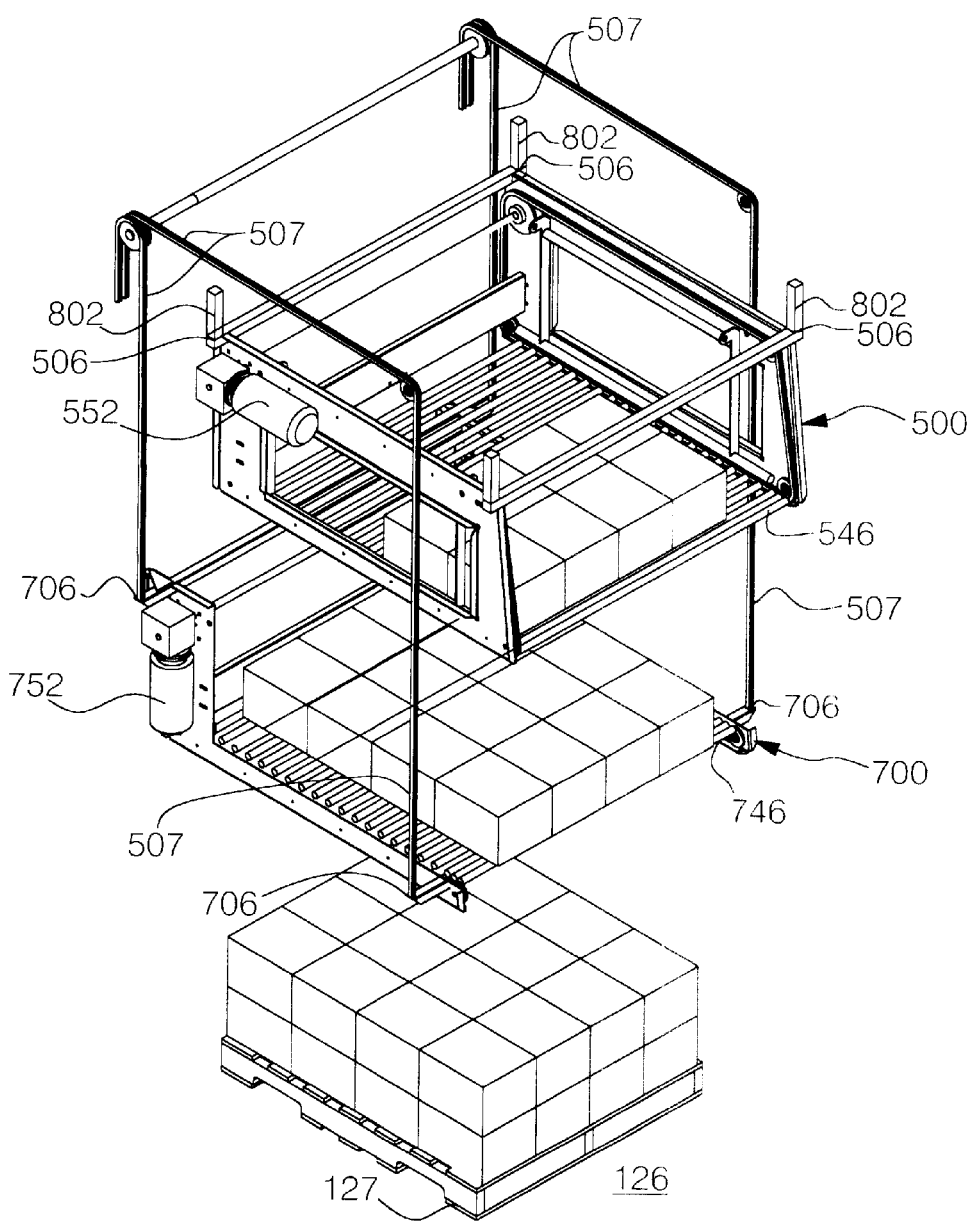
FIG. 18 illustrates in perspective portions of the palletizer system of FIG. 16 including the carriage of FIG. 13 and the carriage of FIG. 15 during a palletizing operation.
Figure 19:
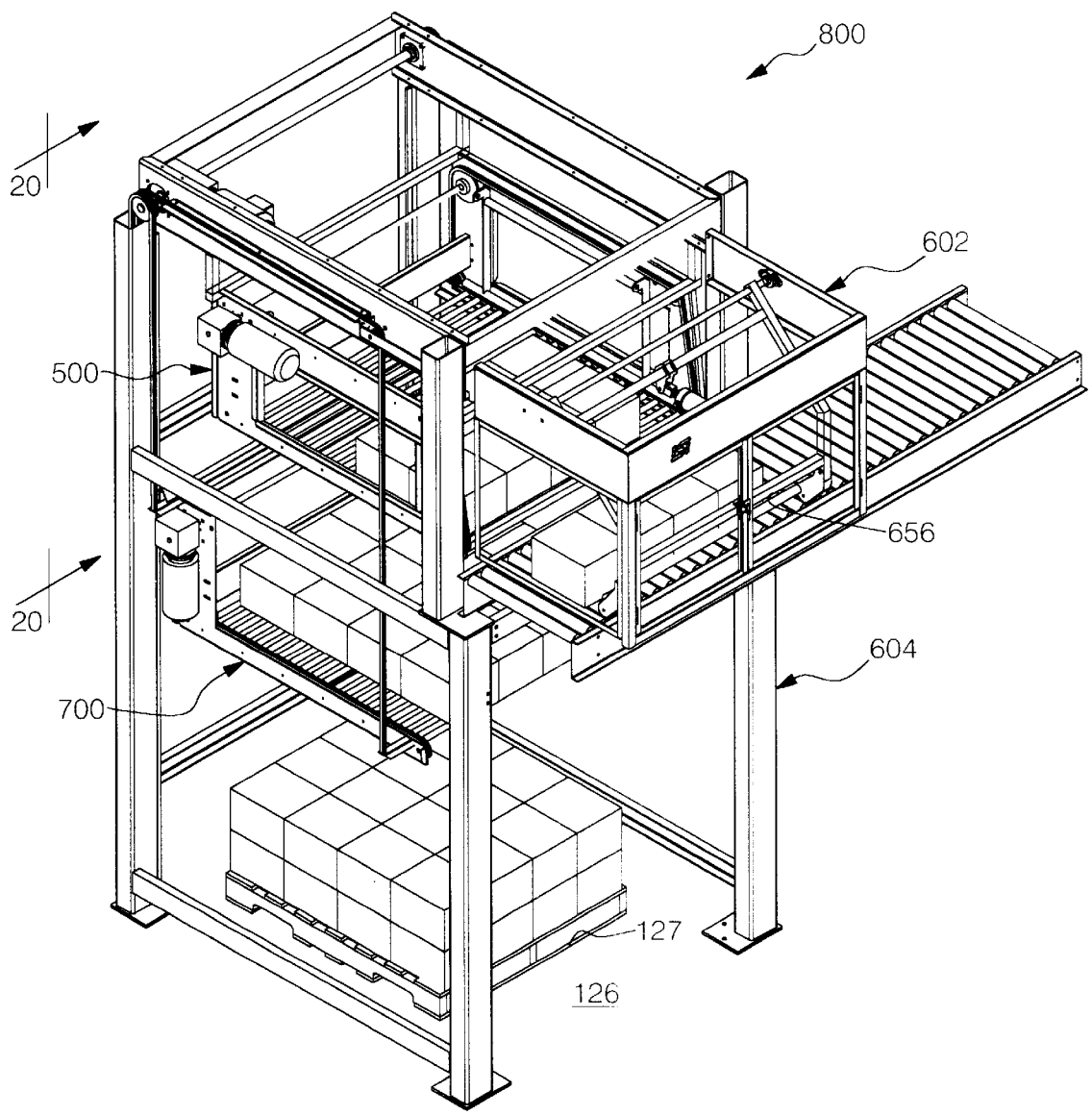
FIG. 19 illustrates in perspective the palletizer system of FIG. 16 during a palletizer operation.
Figure 20:
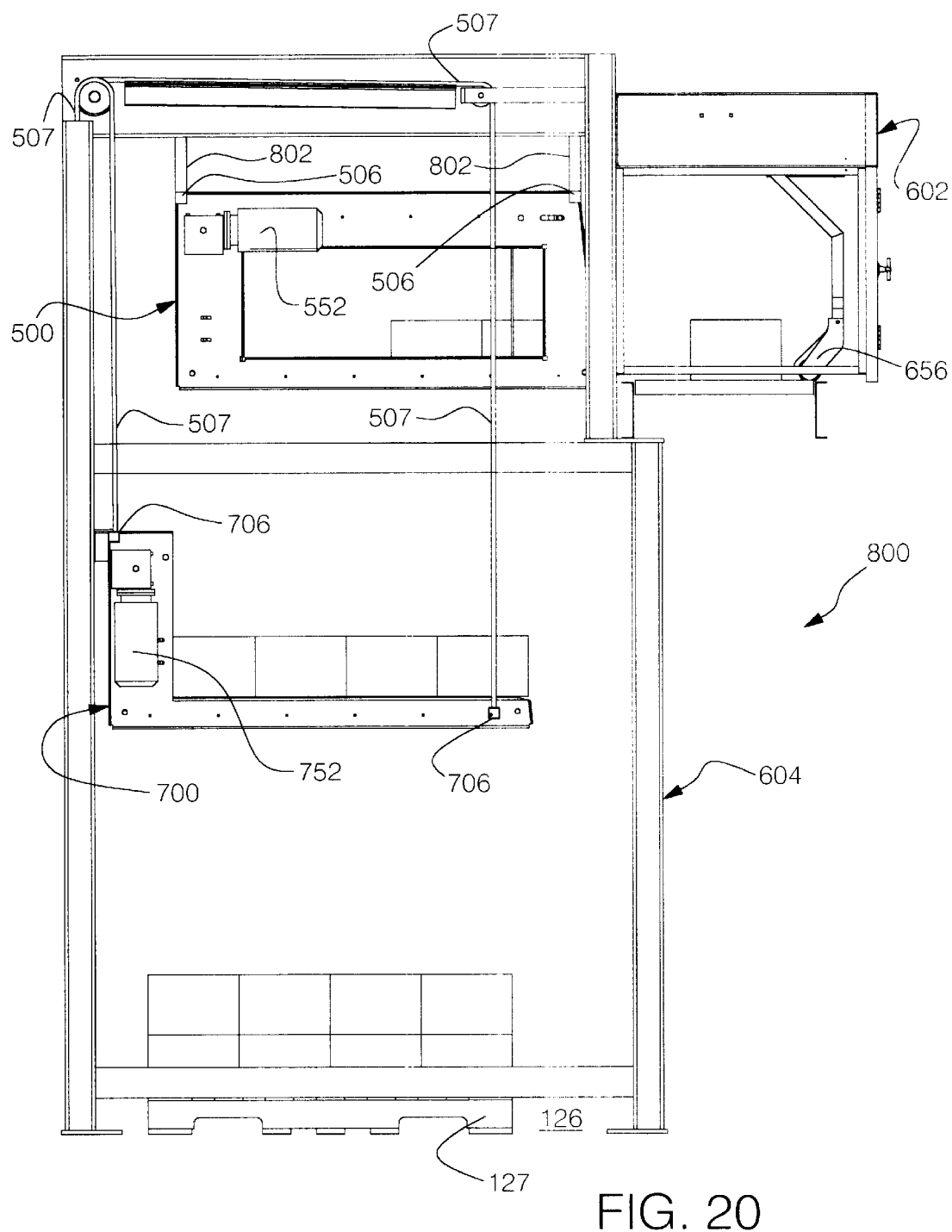
FIG. 20 illustrates the palletizer system of FIG. 19 as taken along lines 20—20 of FIG. 19.

FIG. 16 illustrates system 800 in perspective with carriage 700 in its upper position adjacent carriage 500. FIG. 17 illustrates system 800 as viewed from lines 17—17 of FIG. 16. FIG. 18 illustrates partially system 800 showing the stationary carriage 500, vertically reciprocating carriage 700, and pallet 127 therebelow during a palletizing operation. FIG. 19 illustrates in perspective system 800 during a palletizing operation. FIG. 20 illustrates system 800 during a palletizing operation as viewed along lines 20—20 of FIG. 19.

With reference to FIGS. 16 and 17, carriage 500 mounts in fixed position relative to frame 604. More particularly, vertical struts 802 rigidly couple mount sites 506 of carriage 500 to frame 604. Carriage 500 is thereby fixed in an appropriate position relative to frame 604 and high infeed system 602 to appropriately receive row-by-row items from infeed system 602 in constructing a layer of items upon the roller tubes 546 of carriage 500.

Chains 507 suspend carriage 700 at its mount sites 706. Vertical guide tracks 620 of frame 604 slidably engage vertical guides 722 of carriage 700. Carriage 700 is thereby restricted to a vertical path of travel between its upper position, as illustrated in FIGS. 16 and 17 through a vertical path therebelow to pallet 127. Actuation of drive motor 614 (FIG. 16) in one direction accomplishes downward movement of carriage 700 and reverse actuation accomplishes upward movement of carriage 700.

As best viewed in FIGS. 16 and 17, the open floor L-shaped configuration of carriage 700 allows carriage 700 to move to close proximity relative to carriage 500. More particularly, roller tubes 746 of carriage 700 may be moved into close proximity of roller tubes 546 of carriage 500. This close positioning allows carriage 500 to pass a layer of items to carriage 700. The process of passing a layer of items from carriage 500 to carriage 700 may be accomplished in several ways. For example, roller tubes 700 may be operated in coordinated fashion relative to roller tubes 546 to pull roller tubes 746 under the layer of items as roller tubes 546 withdraw from under the layer of items. This method of passing a layer of items was described earlier in relation to build table 18 and lifthead 24. This same method of transfer may be employed when passing a layer of items from carriage 500 to carriage 700 by coordinated movement of roller tubes 746 to trail behind in substantially the same plane as roller tubes 546. In this regard, it may be necessary to include an extension such as illustrated in FIG. 4 to appropriately position roller tubes 746 within substantially the same plane as roller tubes 546 as discussed above in relation to the transfer between build table 18 and lifthead 24. Alternatively, roller tubes 746 may be brought to their "floor" position as illustrated in FIG. 15 and provide a support surface fully below roller tubes 546 in preparation for transfer from carriage 500 to carriage 700. As roller tubes 546 withdraw from under the layer of items, the layer of items simply drops onto the surface provided by the roller tubes 746 in their floor position.

Figure 22A:
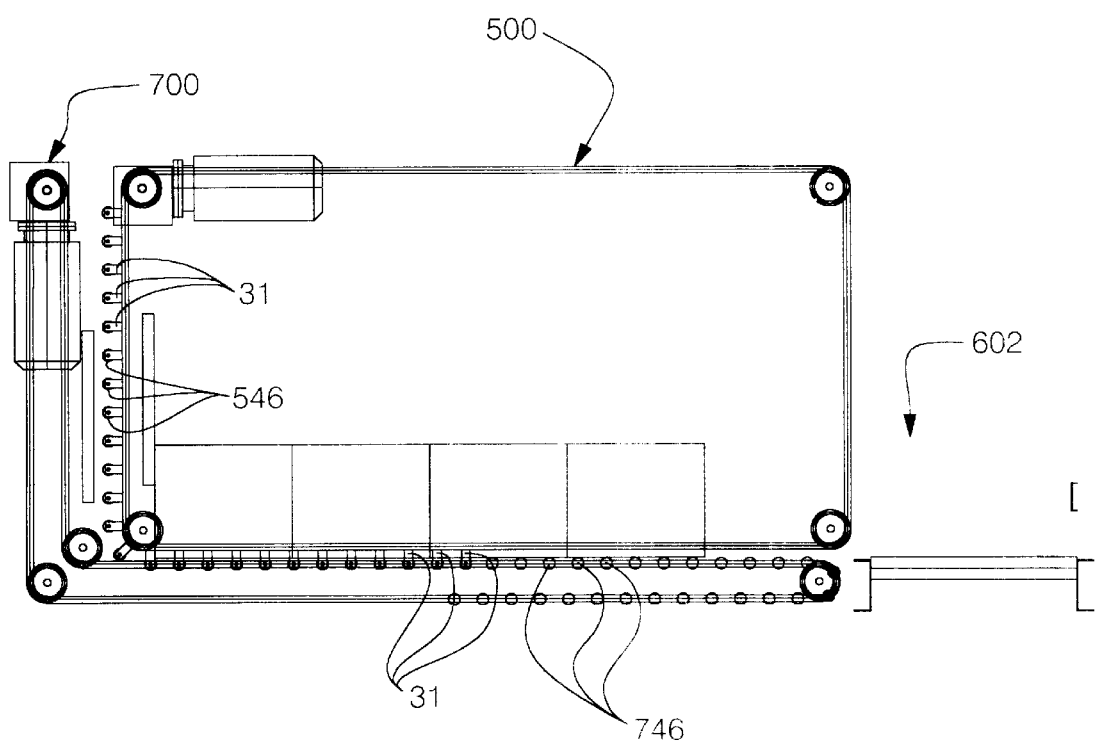
FIGS. 22A and 22B illustrate two alternative methods of passing a layer of items from the carriage of FIG. 13 to the carriage of FIG. 15.
Figure 22B:
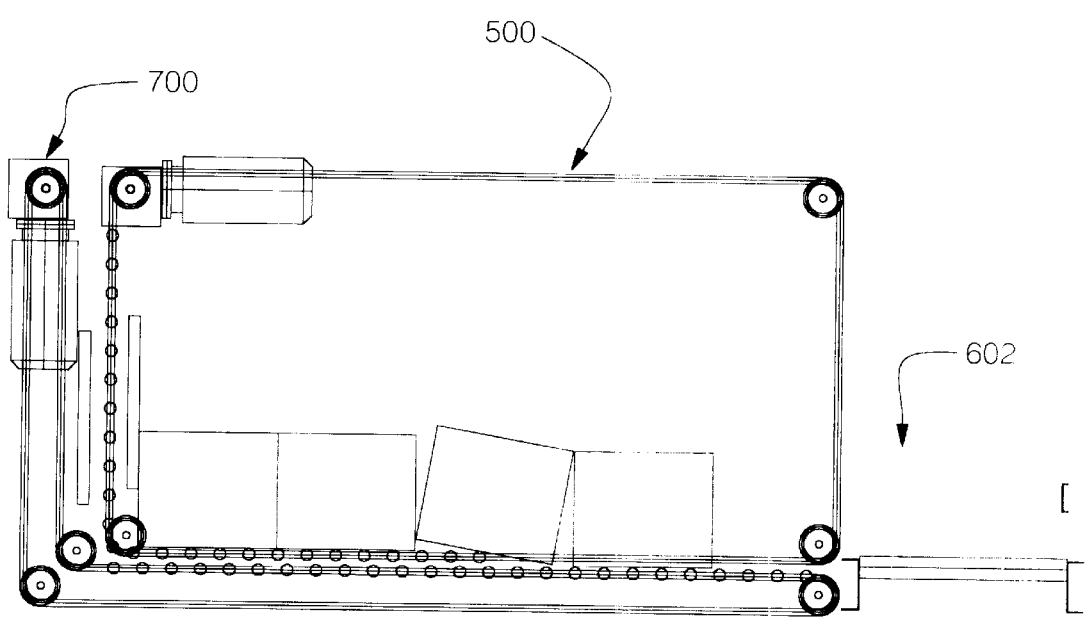

FIGS. 22A and 22B illustrate alternative methods of transferring a layer of items from carriage 500 to carriage 700. In FIG. 22A, carriage 500 is modified to include extensions 31 (such as illustrated in FIG. 4 relative to roller tubes 32). Extensions 31 allow roller tubes 546 of carriage 500 to occupy substantially the same plane as roller tubes 746 of carriage 700 when roller tubes 746 and roller tubes 546 are in their "floor" position. Thus, as illustrated in FIG. 22A roller tubes 746 may be pulled into a supporting floor position behind roller tubes 546 as roller tubes 546 withdraw support from the layer of items. By virtue of the coordinated movement of the "floor" of carriage 700 substantially co-planar with the "floor" of carriage 500, it is possible to initiate the transfer process during a layer building process at carriage 500. In this case, the floor upon which items are pushed by infeed system 602 is provided partially by carriage 500 and partially by carriage 700. FIG. 22B shows an alternative method of handing a layer of items from carriage 500 to carriage 700. In this configuration, roller tubes 746 of carriage 700 are positioned in their floor position and directly below roller tubes 546 of carriage 500. As carriage 500 withdraws roller tubes 546 from under the layer of items, roller tubes 746 in their floor position provide a support surface therebelow. The layer of items are thereby passed from carriage 500 to carriage 700.

FIG. 18 illustrates carriage 500, carriage 700 and pallet 127 therebelow during a palletizing operation. With carriage 500 serving as a pre-build table, it should be appreciated that layer building occurs concurrently with layer transfer. More particularly, once a layer of items has been transferred from carriage 500 to carriage 700, layer building may resume at carriage 500 while that layer is transported vertically downward by carriage 700. Furthermore, because layer building, layer transport, and layer stacking all occur within the same vertical space, palletizing system 800 exhibits not only exceptional speed characteristics but minimal foot print requirements.

FIGS. 19 and 20 also illustrate the palletizing operation while in progress. In FIGS. 19 and 20, high infeed system 602 is in the process of building a layer of items within carriage 500. More particularly, a row of items is ready to be pushed into carriage 500 by means of push bar 656. Concurrently, carriage 700 is in transit from its upper position adjacent carriage 500 toward pallet 127. As may be appreciated, the layer of items carried upon carriage 700 has been collapsed and organized in compact form by virtue of the centering clamps 540 of carriage 500 and the stop plate 558 of carriage 500 as described herein above. When carriage 700 reaches an appropriate vertical position, i.e., relative to the top surface of the stack of layers upon pallet 127, drive motor 752 actuates to pull from under the layer of items the roller tubes 746 and thereby drop the layer of items onto the stack of items currently on pallet 127. Activation of drive motor 614 then pulls carriage 700 upward while concurrent activation of drive motor 752 returns roller tubes 746 to their floor position. Once carriage 700 reaches its upper position adjacent carriage 500, as illustrated in FIGS. 16 and 17, carriage 500 has ready for transfer a layer of items. Drive motor 552 actuates to transfer the layer of items from roller tubes 546 onto roller tubes 746 of carriage 700 and the process continues until pallet 127 is full, i.e., has sufficient number of layers deposited thereon.

Figure 21:
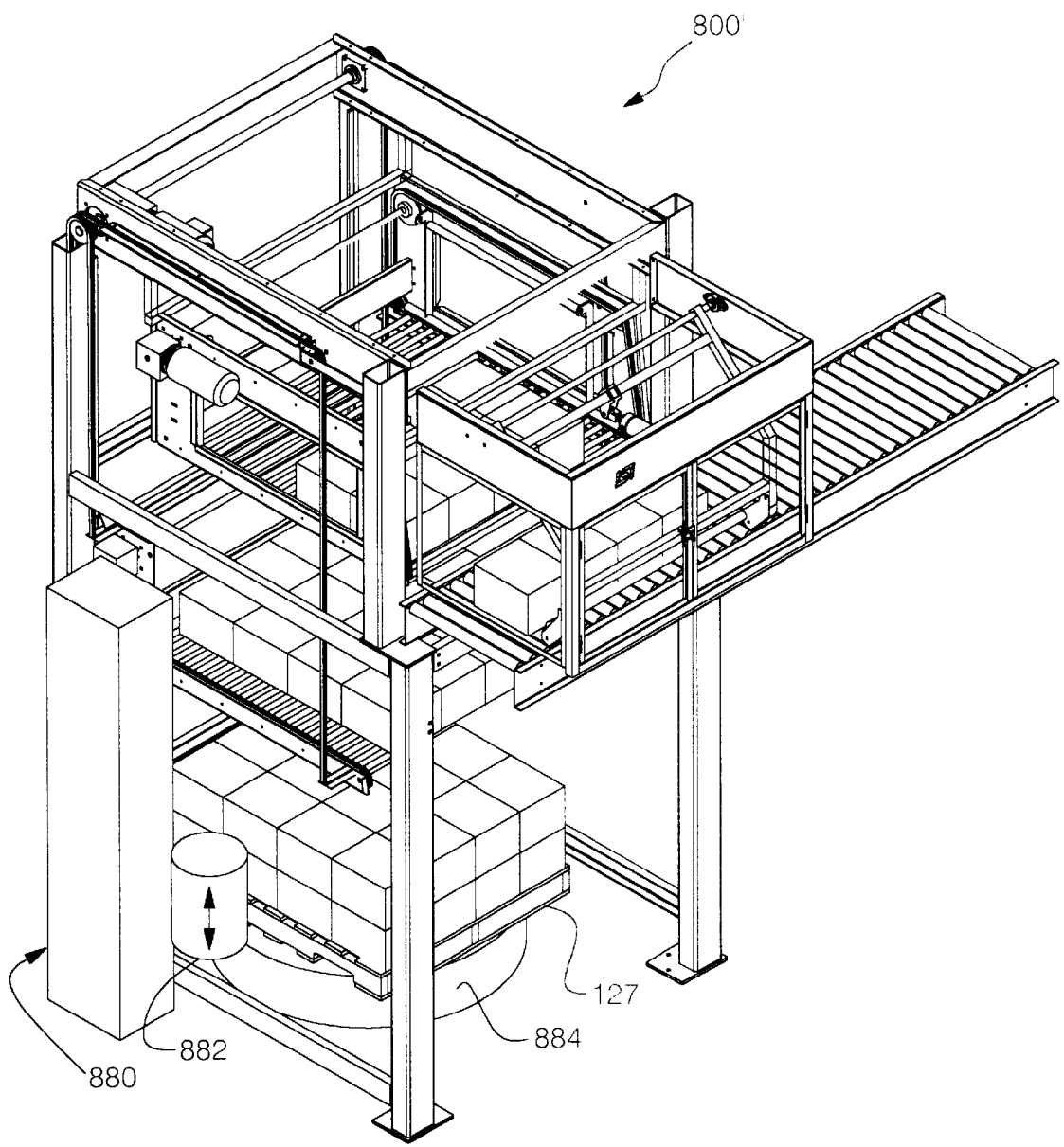
FIG. 21 illustrates a modified palletizer system similar to that of FIG. 16 but incorporating a stretch wrapping system therein.

FIG. 21 illustrates a palletizer system 800' similar to palletizer system 800 as described above and illustrated in FIGS. 16–20. Palletizer system 800' includes also, however, a stretch wrapping system 880. Stretch wrapping system 880 is a conventional stretch wrapping apparatus including a vertically reciprocating wrap dispenser head 882 and a turntable platform 884. Pallet 127 rests upon turntable platform 884 and head 882 positions vertically relative to an upper portion of a partial stack of layers upon pallet 127. During palletizing, after one or more layers have been deposited upon pallet 127 and while carriage 700 is out of the way, i.e., returning to retrieve another layer of items, stretch wrapping system 880 actuates turntable 884 to rotate the entire pallet 127 and stack of layers thereon while appropriately vertically positioning head 882 to dispense wrapping material about the stack of layers on pallet 127. This process continues concurrently with palletizing operations and concludes substantially concurrently with completion of a stack of layers upon pallet 127.

Stretch wrapping system 880 may be provided by conventional stretch wrapping systems such as the Q-series automatic stretch wrapping system available from Lantech, Inc. of Louisville Kentucky, USA. Modifications to the Q-series automatic stretch wrapping system as provided by Lantech, Inc. would include an ability to wrap during a palletizing operation, i.e., to operate concurrently with a palletizing operation to cycle through one circumferential wrap about the stack then hold-off further wrapping until a next layer has been deposited upon the stack. Conventional operation of the Lantech, Inc. Q-series automatic stretch wrapping system wraps an entire stack of items upon a pallet. It will be understood, however, that such adaptation would include a simple hold-off function between each rotation of the turntable 884 in coordination with the stacking of layers upon a pallet resting thereon.

As may be appreciated, stretch wrapping system 880 may be employed on palletizer system 600 to accomplish pallet stack wrapping concurrent with pallet stacking.

Palletizer systems 600, 800, and 800' exhibit important manufacturing and operational characteristics. Because layer pre-build, layer transport, and layer stacking all occur within a small vertical space, the overall foot print requirements are minimized relative to other conventional palletizing systems which require additional lateral space for pre-build tables or for lateral movement of rigid planar support surfaces out from under a layer of items when transferring the items from a transport device onto, for example, a stack of item layers. Furthermore, conventional palletizer systems operating in a "tower" configuration generally require that the pallet receiving layers of items be vertically positionable. The conventional method of palletizing in a "tower" configuration is to move the pallet up to a position below the transfer point, transfer a layer of items onto the pallet, then move the pallet down to an appropriate next position to receive a next layer of items. The tower palletizing systems as shown herein do not require vertical positioning of the pallet. The only movement required of a pallet as shown herein is in the palletizer system 800' which rotates the pallet, but the pallet remains vertically stationary throughout the palletizing operation.

It will be appreciated that the present invention is not restricted to the particular embodiment that has been described and illustrated, and that variations may be made therein without departing from the scope of the invention as found in the appended claims and equivalents thereof.

What is claimed is:

1. An article handling system comprising:
   a frame defining a generally vertical column of space;
   an infeed system positioned relative to an upper portion of said vertical column of space;
   a layer pre-build table receiving items for palletizing and positioned within said upper portion of said vertical column of space;
   a place site at a lower portion of said vertical column of space; and
   a transport device reciprocating vertically within said vertical column of space accepting from said pre-build table a layer of items for palletizing, and moving said layer of items from said pre-build table to said place site therebelow, said transport device including a flexible floor.

2. A system according to claim 1 wherein said transport device is a carriage including said flexible floor being positionable relative to said pre-build table to receive a layer of items from said pre-build table and onto said flexible floor.

3. A system according to claim 1 wherein said system further includes a stretch wrap system including a vertically positionable wrap dispensing head and a turntable as said place site.

4. A system according to claim 3 wherein said stretchwrap system dispenses wrap while rotating said turntable concurrently with operations performed by said article handling system.

5. An article handling system comprising:
   a frame defining generally a vertical column of space;
   an infeed system positioned relative to an upper portion of said vertical column of space;
   a layer pre-build table receiving items for palletizing and positioned within said upper portion of said vertical column of space;
   a place site at a lower portion of said vertical column of space; and
   a transport device reciprocating vertically within said vertical column of space accepting from said pre-build table a layer of items for palletizing, and moving said layer of items from said pre-build table to said place site therebelow, said transport device being a carriage including a flexible floor positionable relative to said pre-build table to receive a layer of items from said pre-build table and onto said flexible floor, said flexible floor being provided by a series of roller tubes moveable into and out of a floor position.

6. An article handling system comprising:
   a frame defining generally a vertical column of space;
   an infeed system positioned relative to an upper portion of said vertical column of space and receiving a series of items to be palletized;
   a layer build table positionable at said upper portion of said vertical column of space to receive said items for palletizing from said infeed system; and transport means reciprocating vertically within said vertical column of space for moving said items to be palletized organized as a layer from said build table vertically downward for stacking at a lower portion of said vertical column of space, said transport means including a flexible floor.

7. A system according to claim 6 wherein said build table vertically reciprocates and serves as said transport means.

8. A system according to claim 6 wherein said build table is stationary at said upper portion of said vertical column of space and said transport device vertically reciprocates between said build table and said lower portion of said vertical column of space.

9. A system according to claim 6 wherein said system further includes a stretch wrap system including a vertically positionable wrap dispensing head and a turntable defining a layer stacking site.

10. A system according to claim 9 wherein said stretch wrap system dispenses wrap while rotating said turntable concurrently with operations performed by said article handling system.

11. An article handling system comprising:

a layer pre-build table;

an infeed system cooperative with said layer pre-build table to assemble a layer of items to be palletized upon said layer pre-build table;

a palletizing site;

a transport device cooperative with said pre-build table to accept from said pre-build table a layer of items for palletizing, said layer pre-build table, palletizing site, and transport device occupying a common vertical space, said transport device reciprocating vertically between said layer pre-build table and said palletizing site, said transport device being adapted for depositing a layer of items for palletizing upon said palletizing site, said transport device including a flexible floor.

12. A system according to claim 11 wherein said system further includes a stretch wrap system including a vertically positionable wrap dispensing head and a turntable as said palletizing site.

13. A system according to claim 12 wherein said stretch wrap system dispenses wrap while rotating said turntable concurrently with operations performed by said article handling system.

\* \* \* \* \*